(12) United States Patent
Lu et al.

(10) Patent No.: US 9,705,419 B2
(45) Date of Patent: Jul. 11, 2017

(54) CONTROL SIGNAL GENERATING SYSTEM AND INVERTER CONTROL DEVICE THEREOF FOR IMPROVING GRID STABILITY

(71) Applicant: DELTA ELECTRONICS, INC., Taoyuan (TW)

(72) Inventors: Cheng Lu, Taoyuan (TW); Dan Wang, Taoyuan (TW); Jia-Min Zhang, Taoyuan (TW); Jian-Hong Zhou, Taoyuan (TW); Hong-Yang Wu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 42 days.

(21) Appl. No.: 14/927,495

(22) Filed: Oct. 30, 2015

(65) Prior Publication Data

US 2016/0134202 A1 May 12, 2016

(30) Foreign Application Priority Data

Nov. 6, 2014 (CN) .......................... 2014 1 0624407

(51) Int. Cl.
*H02M 7/44* (2006.01)
*H02J 3/38* (2006.01)
(Continued)

(52) U.S. Cl.
CPC ............... *H02M 7/44* (2013.01); *H02J 3/381* (2013.01); *H02M 1/42* (2013.01); *H02M 7/539* (2013.01); *H02M 7/493* (2013.01)

(58) Field of Classification Search
CPC .......... H02M 7/44; H02M 1/42; H02M 7/539; H02M 7/493
See application file for complete search history.

(56) References Cited

U.S. PATENT DOCUMENTS

| 2004/0051387 A1* | 3/2004 | Lasseter | H02J 3/46 307/80 |
| 2010/0208501 A1* | 8/2010 | Matan | H02J 3/18 363/95 |

(Continued)

FOREIGN PATENT DOCUMENTS

| CN | 1069000 C | 7/2001 |
| CN | 1941592 A | 4/2007 |

(Continued)

OTHER PUBLICATIONS

T. Liu et al., "A novel droop control strategy to share power equally and limit voltage deviation", Power Electronics and ECCE Asia (ICPE & ECCE), 2011 IEEE 8th International Conference, IEEE, May 30-Jun. 3, 2011, pp. 1520-1526.

(Continued)

*Primary Examiner* — Jue Zhang
*Assistant Examiner* — Lakaisha Jackson
(74) *Attorney, Agent, or Firm* — CKC & Partners Co., Ltd.

(57) ABSTRACT

Inverter control device is provided. First correcting-signal providing unit of the inverter control device provides a signal reflecting an active power correcting signal. Active power control unit of the inverter control device generates an angle control signal reflecting an output voltage phase of an inverter. Second correcting-signal providing unit of the inverter control device provides a signal reflecting a reactive power correcting signal. Reactive power control unit of the inverter control device generates a control signal reflecting an output voltage amplitude of the inverter. Processing unit of the inverter control device receives a feedback signal reflecting an output current of the inverter, a feedback signal reflecting an output voltage of the inverter, the angle control signal, and the control signal, and outputs a signal reflecting the active power of the inverter, a signal reflecting the (Continued)

reactive power of the inverter, and a voltage command signal.

21 Claims, 21 Drawing Sheets

(51) Int. Cl.
*H02M 7/539* (2006.01)
*H02M 1/42* (2007.01)
*H02M 7/493* (2007.01)

(56) References Cited

U.S. PATENT DOCUMENTS

| | | | |
|---|---|---|---|
| 2014/0239726 A1* | 8/2014 | Fornage | H02J 3/00 307/82 |
| 2016/0134201 A1* | 5/2016 | Lu | H02M 7/44 363/71 |
| 2016/0134202 A1* | 5/2016 | Lu | H02M 1/42 363/123 |
| 2016/0349299 A1* | 12/2016 | Zhou | G01R 21/003 |

FOREIGN PATENT DOCUMENTS

| | | |
|---|---|---|
| CN | 101213736 A | 7/2008 |
| CN | 101213736 B | 9/2010 |
| EP | 1286444 A2 | 2/2003 |
| JP | 2007318833 A | 12/2007 |
| JP | 2013039026 A | 2/2013 |
| TW | 201425966 A | 7/2014 |

OTHER PUBLICATIONS

G. Yao et al., "A Central Control Strategy of Parallel Inverters in AC Microgrid", IECON 2013—39th Annual Conference of the IEEE Industrial Electronics Society, IEEE, Nov. 10, 2013, pp. 7112-7117.

* cited by examiner

200

200a

200b

CONTROL SIGNAL GENERATING SYSTEM AND INVERTER CONTROL DEVICE THEREOF FOR IMPROVING GRID STABILITY

RELATED APPLICATIONS

This application claims priority to China Application Serial Number 201410624407.1, filed Nov. 6, 2014, which is herein incorporated by reference.

BACKGROUND

Field of Application

The present application relates to an inverter control technology. More particularly, the present application relates to a control signal generating system and an inverter control device thereof.

Description of Related Art

An inverter is a power conversion device which operates based on power electronic technology. By utilizing appropriate control methods, electric power can be converted from direct current (DC) to alternating current (AC) or from AC to DC. Generally speaking, an inverter comprises a switch unit and a filter unit. The switch unit inverts a DC voltage to an AC voltage. The filter unit receives the output of the switch unit and filters the high frequency components therein to generate the required AC voltage. The filter unit then outputs the AC voltage to the AC port. However, for an inverter connected to a motor or transformer winding, the inverter may not comprise the above-mentioned filter unit. Under the circumstances, the AC voltage output by the switch unit is output to the AC port directly.

The inverter topology is usually but not limited to a two-level three-phase bridge circuit or a multi-level inverter circuit. The multi-level inverter circuit may be a three-level neutral point clamping inverter circuit. Additionally, the filter unit may be but not limited to an L filter, an LC filter, or an LCL filter, etc. In this sense, the filter unit may be another more complex filter structure depending on practical requirements. In addition, the inverter may be but not limited to a three-phase or a single-phase system.

A typical inverter operates as follows. First, the DC port of the inverter is connected to a DC power (such as a battery, a super capacitor, or a DC power supply obtained by another distributed power generating unit via a power conversion device). After that, the inverter converts the received DC power supply through the switches in the switch network. The converted DC power supply is then filtered by the filter unit and output to the AC port. Additionally, the AC port of the inverter is connected to local loads and a grid via switches and isolating transformers (optional) to constitute a micro-grid system.

The micro-grid system may be constituted by one-unit inverter or multi-unit inverters connected in parallel. When the inverter is not connected to a grid, the micro-grid system is in an independent operation state. In other words, the micro-grid system is in an off-grid operation state. When the inverter is connected to a grid, the micro-grid system is in an on-grid operation state.

As for the on-grid operation mode, it is usually assumed that the grid is an ideal voltage source which controls the inverter to allow the inverter to be a controlled current source synchronous with the grid voltage according to the prior art. Such an inverter may be called a current injection inverter. However, when the current injection inverters in the grid account for more and more overall capacity, the grid stability is threatened, which causes the grid no longer to be an ideal voltage source. In addition to that, if the grid entry point is located at a distal end of the grid or in a weak grid, an unstable phenomenon will occur when controlling the prior art current injection inverters.

When considering the independent operation mode, the prior art current injection inverter needs to be switched to voltage source control. This approach will increase the complexity of control, and the load voltage will possibly fluctuate or even be interrupted during the switching process, thus seriously affecting the power supply quality.

For the forgoing reasons, there is a need to solve the above-mentioned inconveniences and shortcomings by providing a control signal generating system and an inverter control device thereof, which is also an objective that the relevant industry is eager to achieve.

SUMMARY

One objective of the present application is to provide a control signal generating system and an inverter control device thereof to solve the problems of the prior art.

An inverter control device is provided. The inverter control device comprises a first correcting-signal providing unit, an active power control unit, a second correcting-signal providing unit, a reactive power control unit, and a processing unit. The first correcting-signal providing unit is configured to receive a frequency setting signal and provide a signal reflecting an active power correcting signal. The active power control unit is configured to receive the signal reflecting the active power correcting signal, an active power setting signal, and a signal reflecting an active power of an inverter to generate an angle control signal reflecting an output voltage phase of the inverter. The second correcting-signal providing unit is configured to receive a voltage setting signal and provide a signal reflecting a reactive power correcting signal. The reactive power control unit is configured to receive the signal reflecting the reactive power correcting signal, a reactive power setting signal, and a signal reflecting a reactive power of the inverter to generate a control signal reflecting an output voltage amplitude of the inverter, the control signal reflecting the output voltage amplitude of the inverter is a voltage amplitude control signal. The processing unit is configured to receive a feedback signal reflecting an output current of the inverter, a feedback signal reflecting an output voltage of the inverter, the angle control signal reflecting the output voltage phase of the inverter, and the control signal reflecting the output voltage amplitude of the inverter to generate the signal reflecting the active power of the inverter, the signal reflecting the reactive power of the inverter, and a voltage command signal.

The application provides an inverter control device. The inverter control device comprises an active power control unit, a correcting-signal providing unit, a reactive power control unit, and a processing unit. The active power control unit is configured to receive an active power setting signal and a signal reflecting an active power of an inverter to generate an angle control signal reflecting an output voltage phase of the inverter. The correcting-signal providing unit is configured to receive a voltage setting signal and provide a signal reflecting a reactive power correcting signal. The reactive power control unit is configured to receive the signal reflecting the reactive power correcting signal, a reactive power setting signal, and a signal reflecting a reactive power of the inverter to generate a control signal reflecting an output voltage amplitude of the inverter. The control signal reflecting the output voltage amplitude of the inverter is a voltage amplitude control signal. The processing unit is configured to receive a feedback signal reflecting an output current of the inverter, a feedback signal reflecting an output voltage of the inverter, the angle control signal reflecting the output voltage phase of the inverter, and the control signal reflecting the output voltage amplitude of the inverter to generate the signal reflecting the active power of the inverter, the signal reflecting the reactive power of the inverter, and a voltage command signal.

The application further provides an inverter control device. The inverter control device comprises a first correcting-signal providing unit, an active power control unit, a second correcting-signal providing unit, a reactive power control unit, and a processing unit. The first correcting-signal providing unit is configured to receive a frequency setting signal and provide a signal reflecting an active power correcting signal. The active power control unit is configured to receive the signal reflecting the active power correcting signal, an active power setting signal, and a virtual torque signal which reflects the active power of the inverter to generate an angle control signal reflecting an output voltage phase of the inverter. The second correcting-signal providing unit is configured to receive a voltage setting signal and provide a signal reflecting a reactive power correcting signal. The reactive power control unit is configured to receive the signal reflecting the reactive power correcting signal, a reactive power setting signal, and a signal reflecting a reactive power of the inverter to generate a control signal reflecting an output voltage amplitude of the inverter. The control signal reflecting the output voltage amplitude of the inverter is a virtual excitation control signal. The processing unit is configured to receive a feedback signal reflecting an output current of the inverter, a virtual motor rotor angle control signal reflecting the output voltage phase of the inverter, the control signal reflecting the output voltage amplitude of the inverter to generate the virtual torque signal which reflects the active power of the inverter, the signal reflecting the reactive power of the inverter, and a voltage command signal.

The embodiments of the present application provide a control signal generating system and an inverter control device thereof, which is categorized as a voltage source on-grid technology and is subject to the characteristics of the controlled voltage source (similar to a synchronous generator of a power system) so as to be adjusted when the voltage and/or frequency of the grid is adjusted. As a result, the grid stability is improved. In addition, the control signal generating system and the inverter control device thereof provided by the embodiments of the present application are compatible with both the on-grid operation mode and the independent operation mode so there is no necessity to switch the control architecture and the load power supply is not interfered with during the off-grid switching process. The seamless switching between the grid and the micro-grid is therefore achieved.

It is to be understood that both the foregoing general description and the following detailed description are by examples, and are intended to provide further explanation of the application as claimed.

BRIEF DESCRIPTION OF THE DRAWINGS

The accompanying drawings are included to provide a further understanding of the application, and are incorporated in and constitute a part of this specification. The drawings illustrate embodiments of the invention and, together with the description, serve to explain the principles of the application. In the drawings.

DESCRIPTION OF THE EMBODIMENTS

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Unless otherwise defined herein, scientific and technical terminologies employed in the present disclosure shall have the meanings that are commonly understood and used by one of ordinary skill in the art. Unless otherwise required by context, it will be understood that singular terms shall include plural forms of the same and plural terms shall include the singular.

As used herein, "couple" refers to direct physical contact or electrical contact or indirect physical contact or electrical contact between two or more devices. Or it can also refer to reciprocal operations or actions between two or more devices.

In order to improve the situation in which the grid stability is threatened because of the increased capacity accounted for by the current injection inverters in the grid, the present application provides a control signal generating system and an inverter control device thereof. The control signal generating system and the inverter control device is categorized as a voltage source on-grid technology, and is subject to the characteristics of the controlled voltage source so as to be adjusted when the voltage and frequency of the grid is adjusted. As a result, the grid stability is improved.

Figure 1:
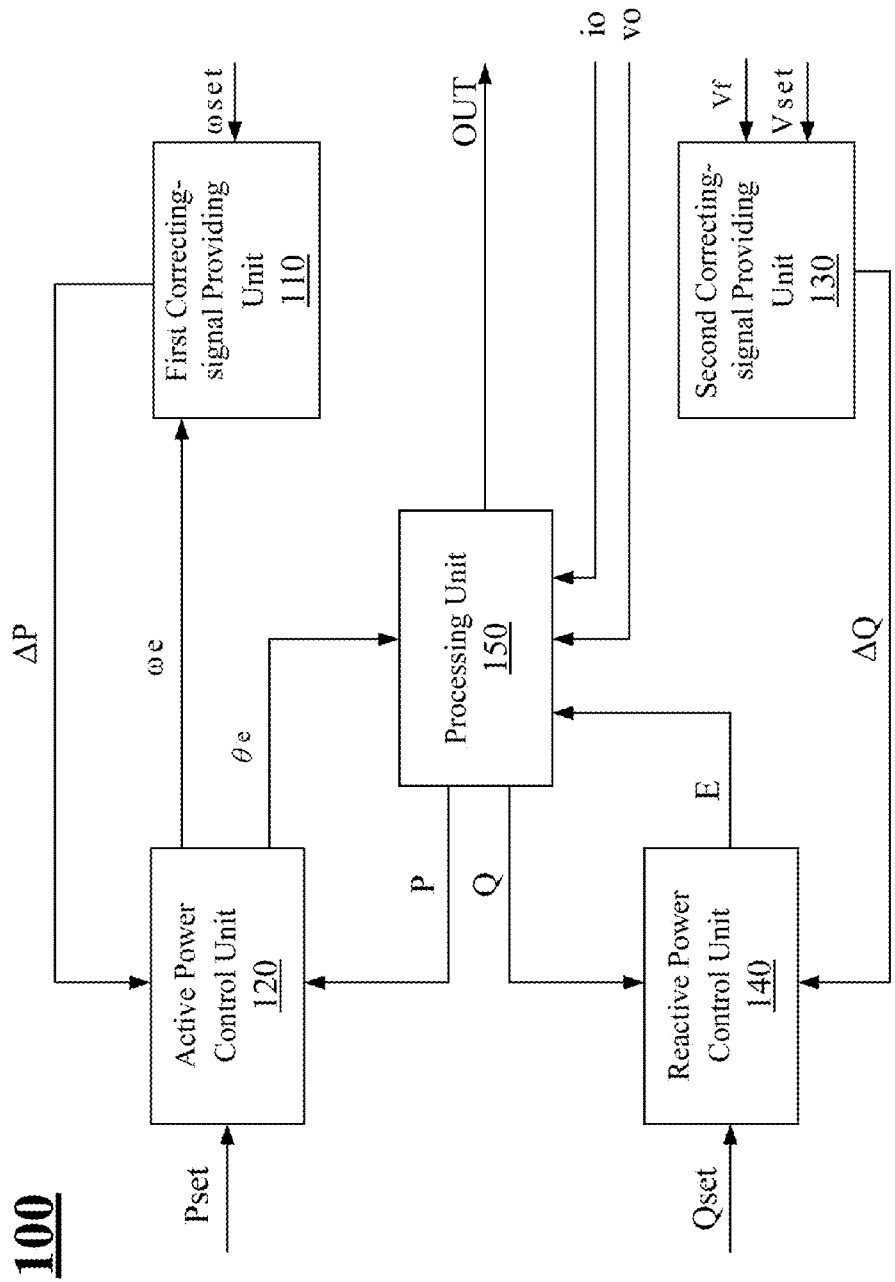
FIG. 1 depicts a schematic diagram of an inverter control device according to one embodiment of this application.

FIG. 1 depicts a schematic diagram of an inverter control device 100 according to one embodiment of this application. As shown in the figure, an inverter control device 100 comprises a first correcting-signal providing unit 110, an active power control unit 120, a second correcting-signal providing unit 130, a reactive power control unit 140, and a processing unit 150.

In operation, the first correcting-signal providing unit 110 is configured to receive a frequency setting signal $\omega_{set}$ and provide a signal reflecting an active power correcting signal $\Delta P$. The active power control unit 120 is configured to receive the signal reflecting the active power correcting signal $\Delta P$, an active power setting signal Pset, and a signal reflecting an active power of an inverter P so as to generate an angel control signal reflecting an output voltage phase of the inverter $\theta_e$. The second correcting-signal providing unit 130 is configured to receive a voltage setting signal Vset and provide a signal reflecting a reactive power correcting signal $\omega Q$. The reactive power control unit 140 is configured to receive the signal reflecting the reactive power correcting signal $\omega Q$, a reactive power setting signal Qset, and a signal reflecting a reactive power of the inverter Q so as to generate a control signal reflecting an output voltage amplitude of the inverter E. The processing unit 150 is coupled to the active power control unit 120 and the reactive power control unit 140 and is configured to receive a feedback signal reflecting an output current of the inverter io, a feedback signal reflecting an output voltage of the inverter vo, the angle control signal reflecting the output voltage phase of the inverter $\theta_e$, the control signal reflecting the output voltage amplitude of the inverter E so as to generate the signal reflecting the active power of the inverter P, the signal reflecting the reactive power of the inverter Q, and a voltage command signal OUT.

Through the above operations, the inverter is allowed to have characteristics similar to a synchronous generator. Thus, the inverter can be adjusted when adjusting the voltage and frequency of the grid to fulfill the operation requirements of the electric power system so as to improve the grid stability. In addition to that, adopting the inverter control device is compatible with both the on-grid operation mode and the independent operation mode so there is no necessity to switch the control architecture and the load power supply is not interfered with during the switching process between on-grid and off-grid. The seamless switching between the grid and the micro-grid is therefore achieved. Additionally, adopting the inverter control device facilitates the realization of parallel operations of multiple inverters.

A major technical means of the inverter control device to solve the problems according to the embodiment of the present application is described above. In the following, embodiments for realizing the inverter control device are provided to facilitate an understanding of the present application. However, the present application is not limited to the following embodiments, which must be explained first.

Figure 2:
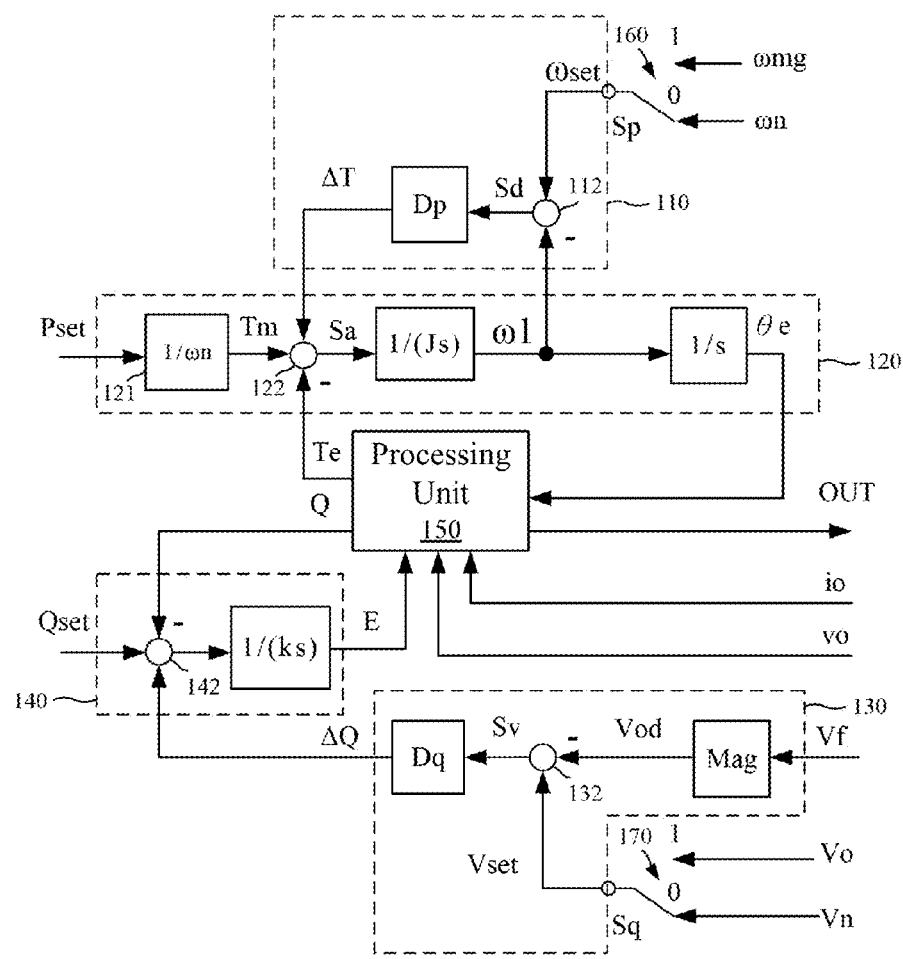
FIG. 2 depicts a circuit schematic diagram of the inverter control device in FIG. 1 in detail according to another embodiment of this application.

FIG. 2 depicts a circuit schematic diagram of the inverter control device 100 in FIG. 1 in detail according to another embodiment of this application. Different from the embodiment shown in FIG. 1, the signal reflecting the active power signal of the inverter P is a torque signal Te, the signal reflecting the active power correcting signal $\Delta P$ is a torque correcting signal $\Delta T$. In addition, the active power control unit 120 comprises a driving torque generating unit 121, a first superposition unit 122, a first integrating unit 1/(Js), and a second integrating unit 1/s. The above driving torque generating unit 121 is configured to receive the active power setting signal Pset and divide the active power setting signal Pset by an angular frequency signal $\omega n$ to generate a driving torque command signal Tm. The first superposition unit 122 is configured to receive the driving torque command signal Tm, the torque signal Te, and the torque correcting signal $\Delta T$ to generate an acceleration signal Sa. The first integrating unit 1/(Js) is configured to receive the acceleration signal Sa to generate a first frequency control signal $\omega 1$. The second integrating unit 1/s is configured to receive the first frequency control signal $\omega 1$ to generate the angle control signal reflecting the output voltage phase of the inverter $\theta_e$.

A description is provided with reference to FIG. 1 and FIG. 2. Calculation methods for various output parameters of the processing unit 150 are exemplified. The output parameters of the processing unit 150 comprises the voltage command signal OUT, the signal reflecting the reactive power of the inverter Q, and the torque signal Te.

First, the calculation formula for the voltage command signal OUT is as follows:

$$e^* = E \angle \theta_e \qquad \text{formula 1}$$

As shown in formula 1, the processing unit 150 calculates the voltage command signal OUT based on the control signal reflecting the output voltage amplitude of the inverter E and the angle control signal reflecting the output voltage phase of the inverter $\theta_e$. The voltage command signal OUT may be an AC voltage command signal $e^*$.

Second, the calculation formula for the signal reflecting the reactive power of the inverter Q is as follows:

$$Q = v_o \otimes i_o \quad \text{formula 2}$$

As shown in formula 2, the processing unit 150 calculates the signal reflecting the reactive power of the inverter Q based on a cross product of the feedback signal reflecting the output voltage of the inverter vo and the feedback signal reflecting the output current of the inverter io.

Third, before calculating the torque signal Te, the signal reflecting the active power of the inverter P needs to be calculated first, the calculation formula for the signal reflecting the active power of the inverter P is as follows:

$$P = v_o \cdot i_o \quad \text{formula 3}$$

As shown in formula 3, the processing unit 150 calculates the signal reflecting the active power of the inverter P based on a dot product of the feedback signal reflecting the output voltage of the inverter vo and the feedback signal reflecting the output current of the inverter io.

In addition, the calculation formula for the torque signal Te is as follows:

$$T_e = P/\omega_n \quad \text{formula 4}$$

As shown in formula 4, the processing unit 150 can divide the signal reflecting the active power of the inverter P by the angular frequency signal ωn which reflects an angular frequency of the system to obtain the virtual torque signal $T_e$ which reflects the active power of the inverter. The angular frequency signal ωn may be a rated angular frequency or a current output angular frequency $\omega_e$ of the inverter.

As shown in FIG. 2, the first correcting-signal providing unit 110 comprises a first correcting-signal generating unit 112 and a first proportion unit Dp. The first correcting-signal generating unit 112 is configured to receive the first frequency control signal ω1 and the frequency setting signal ωset to generate a frequency deviation signal Sd. The first proportion unit Dp is configured to receive the frequency deviation signal Sd to generate the torque correcting signal ΔT which is the signal reflecting the active power correcting signal ΔP.

An additional description is provided with reference to FIG. 2. The second correcting-signal providing unit 130 comprises an amplitude computation unit Mag, a second correcting-signal generating unit 132, and a second proportion unit Dq. The amplitude computation unit Mag is configured to calculate an amplitude signal Vod based on a feedback signal of an output voltage of the inverter Vf. The second correcting-signal generating unit 132 is configured to receive the amplitude signal Vod and the voltage setting signal Vset and compare the amplitude signal Vod with the voltage setting signal Vset to generate a voltage deviation signal Sv. The second proportion unit Dq is configured to receive the voltage deviation signal Sv to generate the signal reflecting the reactive power correcting signal ΔQ.

In one embodiment, an inverter control device 100a further comprises a first selection unit 160 and a second selection unit 170. The first selection unit 160 is configured to select either the frequency signal ωn which reflects a rated output voltage of the inverter or a frequency signal ωmg which reflects an actual output voltage of the inverter to be the frequency setting signal ωset. The second selection unit 170 is configured to select either an amplitude signal reflecting the rated output voltage of the inverter Vn or an amplitude signal reflecting the actual output voltage of the inverter Vo to be the voltage setting signal Vset. In another embodiment, when the frequency setting signal ωset is the frequency signal ωn which reflects the rated output voltage of the inverter, the active power control unit 120 is in a droop operation mode. When the frequency setting signal ωset is the frequency signal ωmg which reflects the actual output voltage of the inverter, the active power control unit 120 is in a demand operation mode. In still another embodiment, when the voltage setting signal Vset is the amplitude signal reflecting the rated output voltage of the inverter Vn, the reactive power control unit 140 is in the droop operation mode. When the voltage setting signal Vset is the amplitude signal reflecting the actual output voltage of the inverter Vo, the reactive power control unit 140 is in the demand operation mode. Those of ordinary skill in the art would understand that the first selection unit 160 can render the active power control unit 120 to be in the droop operation mode or the demand operation mode, and the second selection unit 170 can render the reactive power control unit 140 to be in the droop operation mode or the demand operation mode. Hence, in some embodiments, the frequency setting signal ωset and the voltage setting signal Vset may be selected at the same time so that the active power control unit 120 and the reactive power control unit 140 of the inverter are in random combinations of the droop operation mode and the demand operation mode.

A description is provided with reference to FIG. 2. The reactive power control unit 140 comprises a reactive deviation generating unit 142 and a voltage adjustment unit 1/(ks). The reactive deviation generating unit 142 is configured to receive the reactive power setting signal Qset, the signal reflecting the reactive power of the inverter Q, and the signal reflecting the reactive power correcting signal ΔQ to generate a reactive power deviation signal. The voltage adjustment unit 1/(ks) is configured to receive the reactive power deviation signal to generate the control signal reflecting the output voltage amplitude of the inverter E. In one embodiment, the voltage adjustment unit 1/(ks) may be an integrating unit or a proportional integrating unit.

Figure 3:
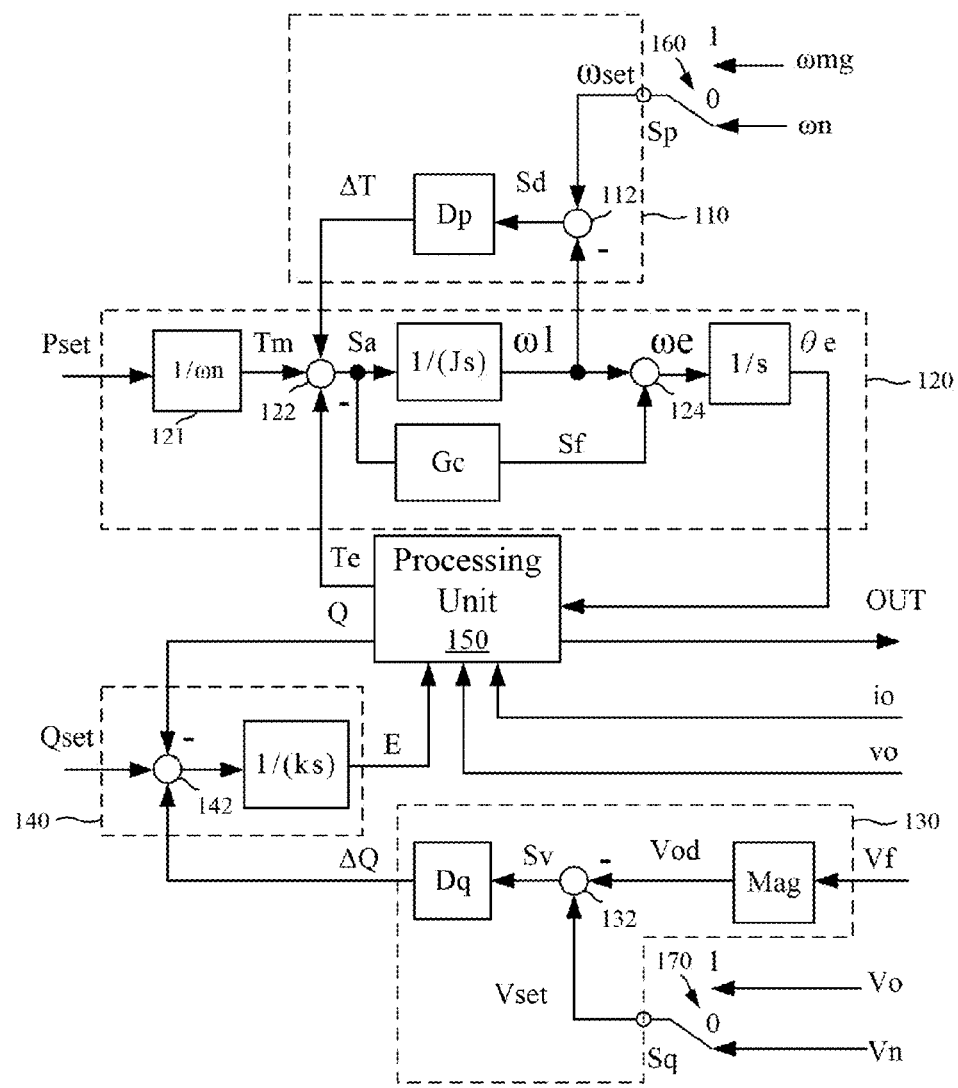
FIG. 3 depicts a circuit schematic diagram of the inverter control device in FIG. 1 in detail according to still another embodiment of this application.

FIG. 3 depicts a circuit schematic diagram of the inverter control device 100 in FIG. 1 in detail according to still another embodiment of this application. As compared with the inverter control device 100a shown in FIG. 2, the active power control unit 120 of an inverter control device 100b further comprises a feedforward computation unit Gc and an adjustment unit 124. The feedforward computation unit Gc is configured to receive the acceleration signal Sa to generate a second frequency control signal Sf. The adjustment unit 124 is configured to receive the first frequency control signal ω1 and the second frequency control signal Sf to generate a control signal reflecting an output voltage frequency of the inverter ωe. Additionally, the second integrating unit 1/s is further configured to generate a phase control signal θe based on the control signal reflecting the output voltage frequency of the inverter ωe.

Figure 4:
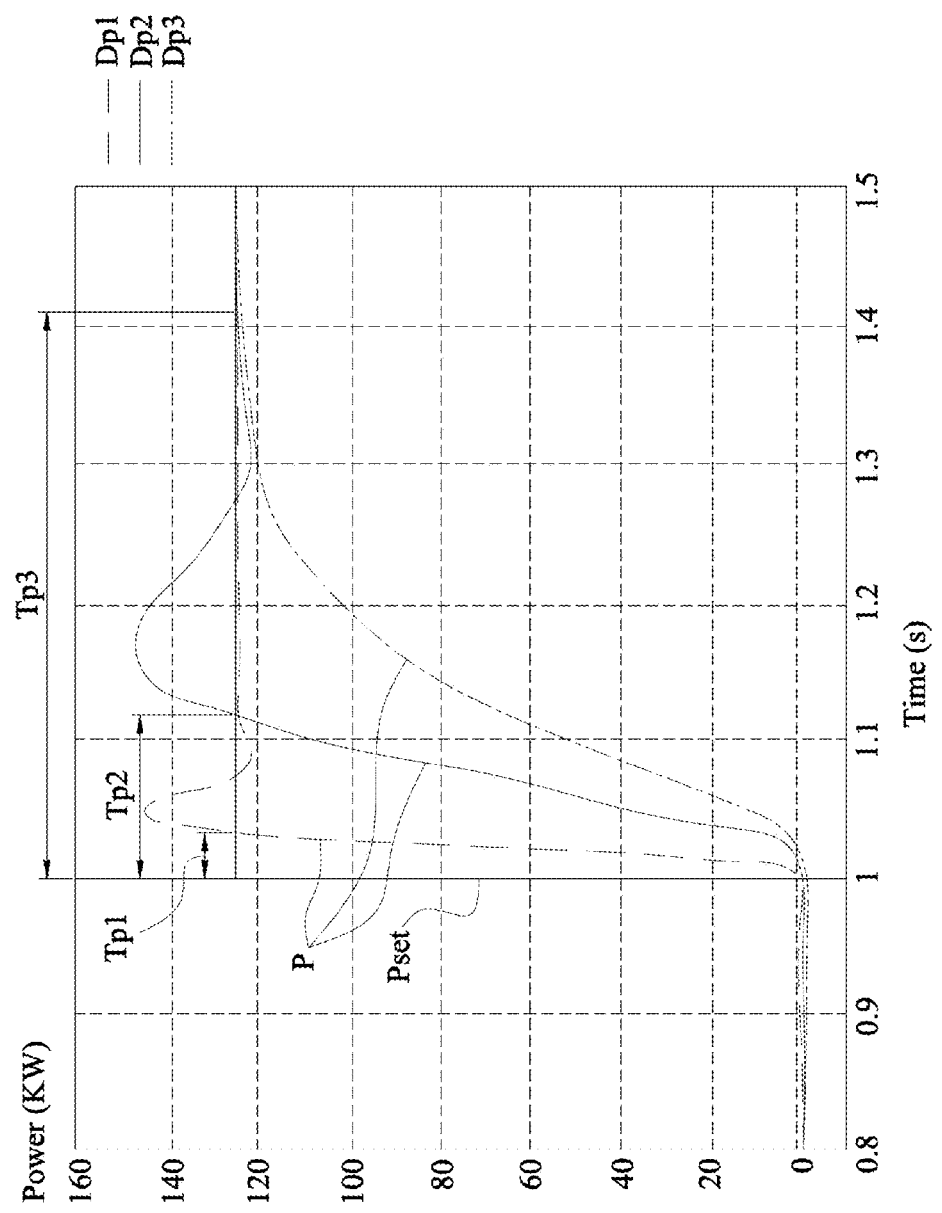
FIG. 4(a) and FIG. 4(b) depict schematic diagrams of dynamic response curves of an active power output by an inverter when a droop slope parameter is different respectively before and after disposing a feedforward computation unit.
Figure 4:
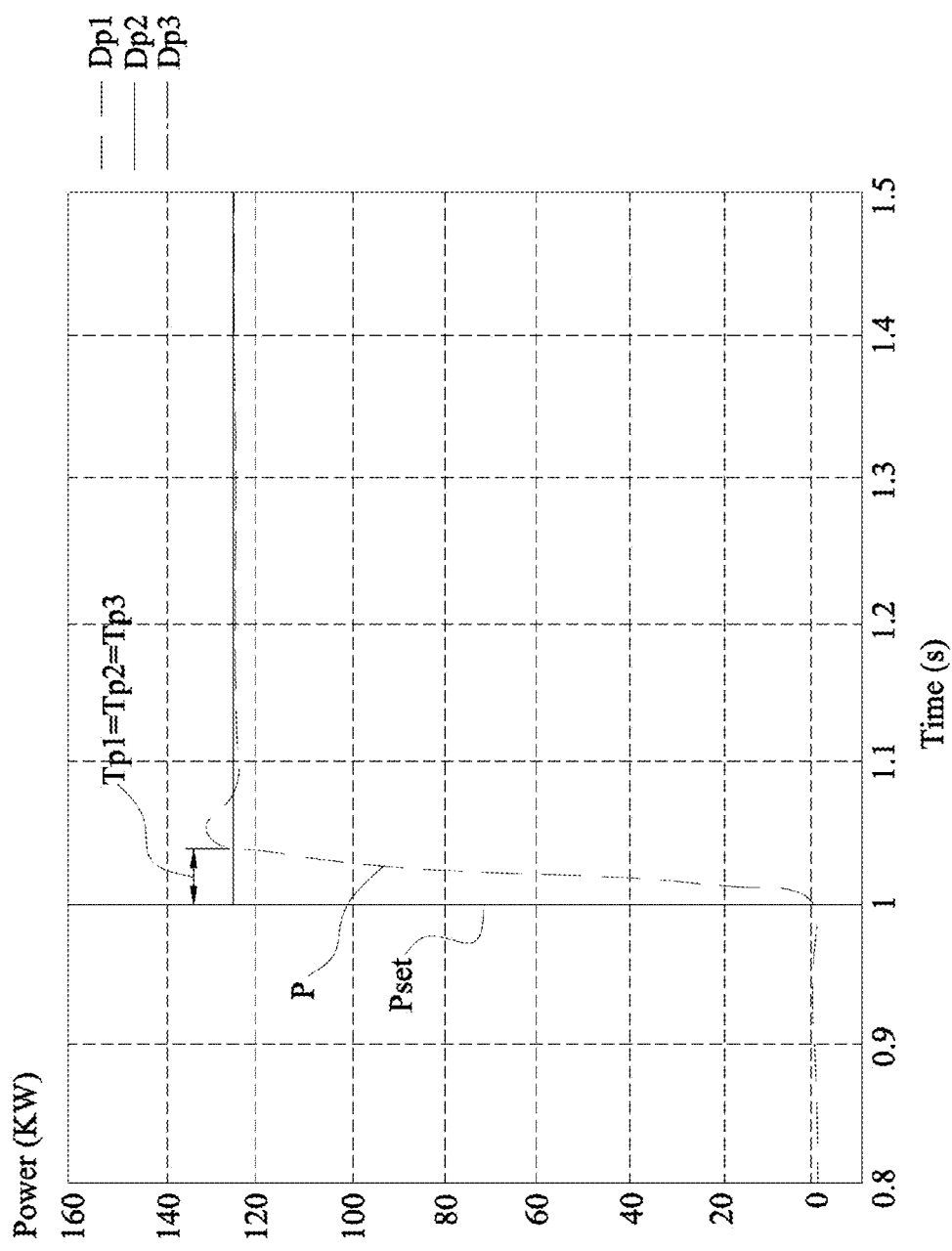

FIG. 4(a) and FIG. 4(b) depict schematic diagrams of dynamic response curves of an active power output by an inverter when a droop slope parameter is different respectively before and after disposing a feedforward computation unit. According to the prior art, an amount of the output active power compensated by the inverter is affected by a droop slope parameter Dp, which may usually be set by users. For example, the greater the Dp is, the greater the compensated active power is under the same frequency deviation. However, the parameter not only affects the droop slope but also the dynamic response of the active power output by the inverter. Usually, the greater the Dp is, the slower the response of the output active power following the active power setting signal Pset is. As shown in FIG. 4(a), at the first second, the active power setting signal Pset increases by a step. A response time Tp of the active power of the inverter P (which is defined as the time required by P to reach steady state the first time) is Tp3, Tp2, Tp1 respectively corresponding to three different setting conditions of Dp in which, for example, Dp3>Dp2>Dp1, and Tp3>Tp2>Tp1. When the response time is particularly long, it's possible that the dynamic index of the inverter required by the system cannot be met. As a result, the double requirements in both the droop slope and dynamic response cannot be satisfied. In contrast, in the embodiment shown in FIG. 3, the feedforward computation unit Gc is introduced into the active power control unit 120 so users are able to control the droop slope and dynamic response independently. For example, under different parameter settings of Dp, the response time of the output active power following the active power setting signal Pset is kept constant. As shown in FIG. 4(b), the response time Tp of the active power of the inverter P is kept constant, that is Tp1=Tp2=Tp3, under the same setting conditions of Dp in FIG. 4(a).

An additional description is provided with reference to FIG. 3. The present application further discloses an active power control circuit. The active power control circuit comprises the driving torque generating unit 121, the first superposition unit 122, the first integrating unit 1/(Js), the feedforward computation unit Gc, the adjustment unit 124, and the second integrating unit 1/s. The driving torque generating unit 121 is configured to receive the active power setting signal Pset and divide the active power setting signal Pset by the angular frequency signal ωn to generate the driving torque command signal Tm. The first superposition unit 122 is configured to receive the driving torque command signal Tm, the torque signal Te, and the torque correcting signal ΔT to generate the acceleration signal Sa. The first integrating unit 1/(Js) is configured to receive the acceleration signal Sa to generate the first frequency control signal ω1. The feedforward computation unit Gc is configured to receive the acceleration signal Sa to generate the second frequency control signal Sf. The adjustment unit 124 is configured to receive the first frequency control signal ω1 and the second frequency control signal Sf to generate the control signal reflecting the output voltage frequency of the inverter θe. The second integrating unit 1/s is configured to receive the control signal reflecting the output voltage frequency of the inverter θe so as to generate the angle control signal reflecting the output voltage phase of the inverter θe.

Figure 5:
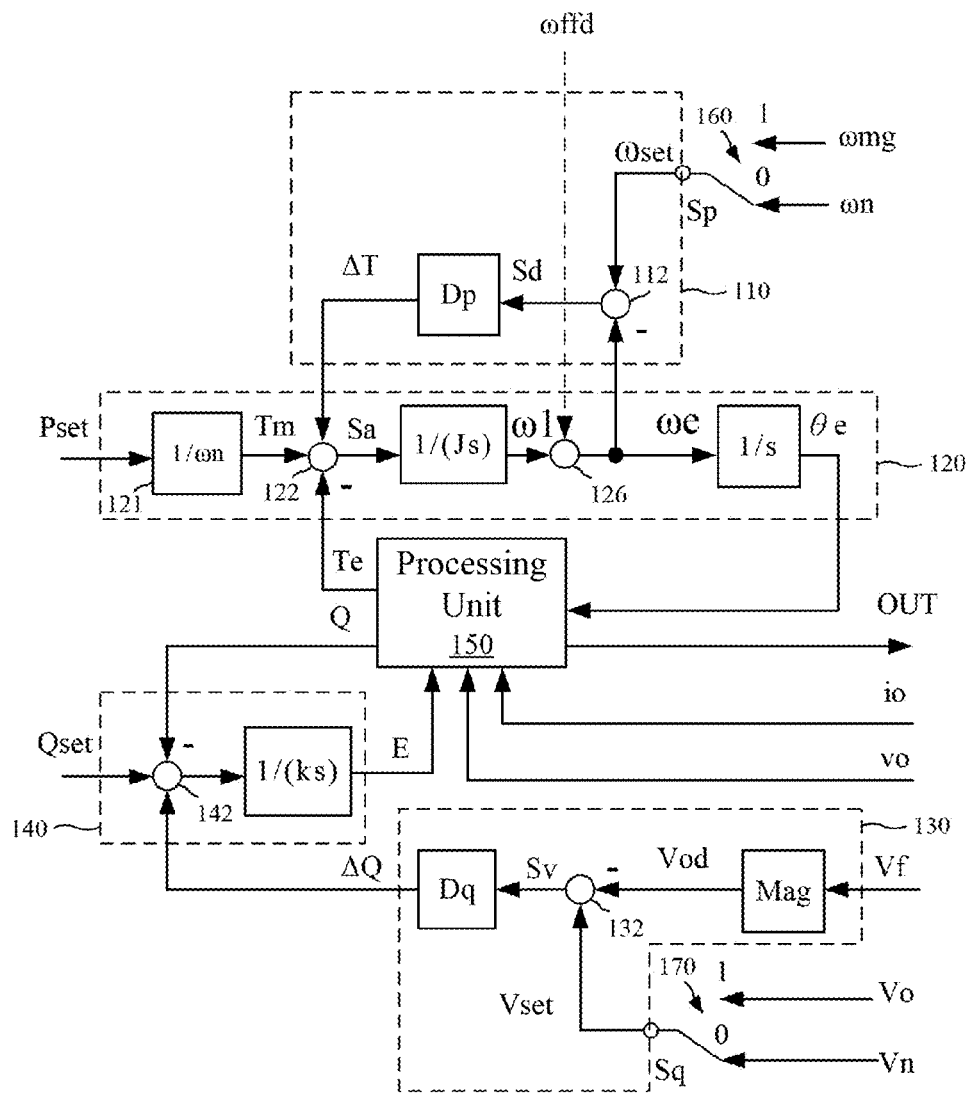
FIG. 5 depicts a circuit schematic diagram of the inverter control device in FIG. 1 in detail according to yet another embodiment of this application.

FIG. 5 depicts a circuit schematic diagram of the inverter control device 100 in FIG. 1 in detail according to yet another embodiment of this application. As compared with the inverter control device 100a shown in FIG. 2, the active power control unit 120 of an inverter control device 100c further comprises an adjustment unit 126. The adjustment unit 126 is configured to receive a frequency feedforward signal ωffd and adjust the control signal reflecting the output voltage frequency of the inverter ωe based on the frequency feedforward signal ωffd and the first frequency control signal ω1. The feed forward signal ωffd could be the frequency setting signal ωset, the grid frequency ωg or the microgrid frequency.

Figure 6:
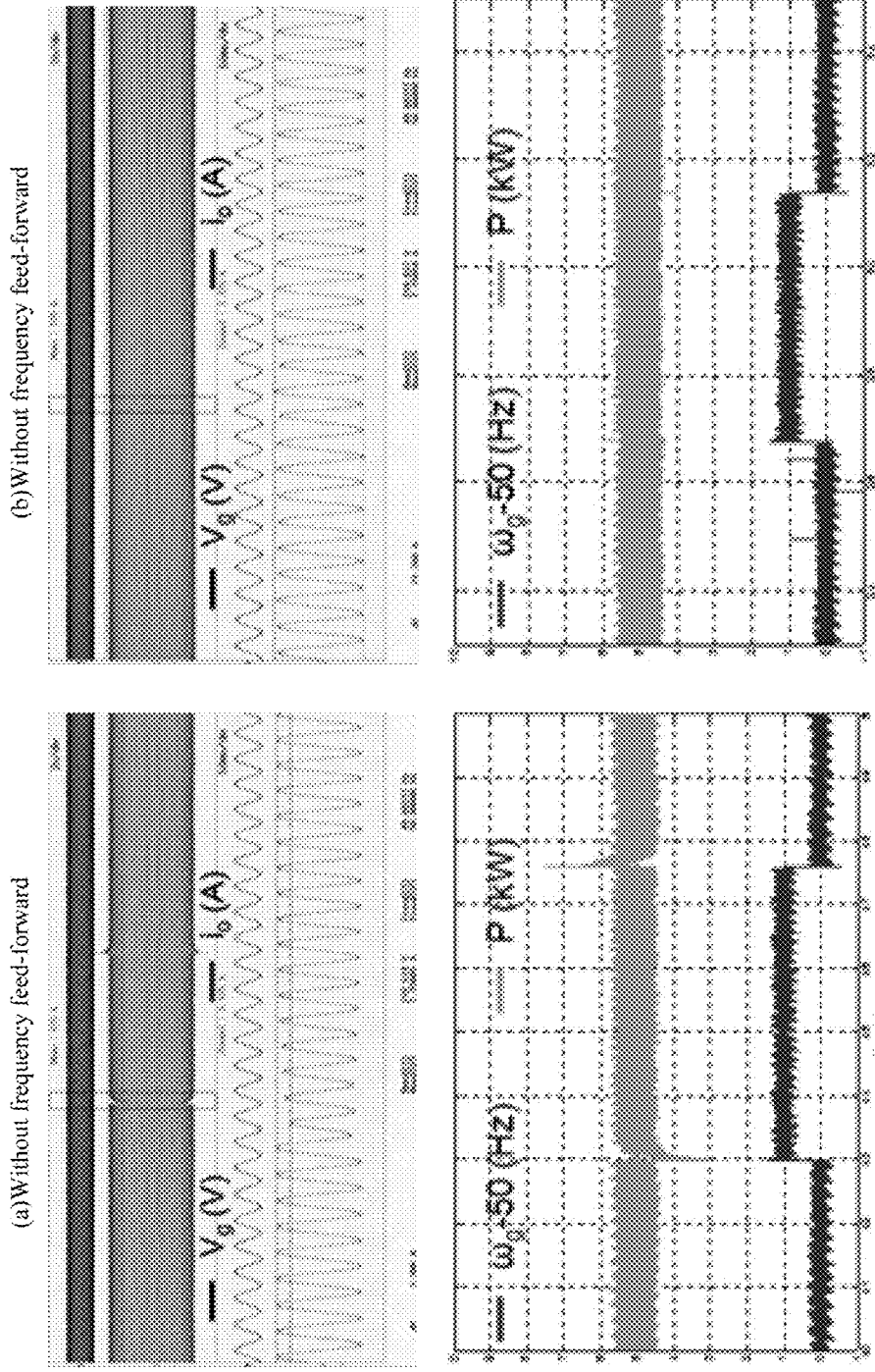
FIG. 6(a) and FIG. 6(b) depict schematic diagrams of dynamic response curves of an active power of an inverter when a grid voltage frequency fluctuates respectively before and after disposing a frequency feedforward unit.

FIG. 6(a) and FIG. 6(b) depict schematic diagrams of dynamic response curves of an active power of an inverter when a grid voltage frequency fluctuates respectively before and after disposing a frequency feedforward unit. When the active power control unit is in the demand operation mode, the mode may usually be used in the maximum power point tracking (MPPT) control of renewable energy power generation so as to maximum the electricity capacity. Under the circumstances, the inverter device is required to stably track the power commands dispatched by the upper-level control system. However, whenever the frequency of the grid voltage varies, the current or active power output of the control device in the prior art will deviate from the commands, which means the maximum power point cannot be tracked well and even causes the inverter to overload or shutdown due to failure caused by the overcurrent. In the embodiment shown in FIG. 5, the frequency feedforward signal ωffd is introduced into the active power control unit 120 to allow the demand control mode to have good robustness (or called stability) against fluctuations of grid voltage frequency. FIG. 6(a) and FIG. 6(b) are dynamic responses of an output current and an active power of an inverter when a grid voltage frequency varies, and a frequency of an analog grid increases by a step of 1 Hz respectively in FIG. 6(a) and FIG. 6(b). As for the control device in FIG. 6(a) in which the frequency feedforward signal ωffd is not introduced, the output current or active power fluctuates corresponding to variations of a grid frequency ωg. For example, the output active power P varies up and down correspondingly following variations of the grid frequency ωg. As for the control device in FIG. 6(b) in which the frequency feedforward signal ωffd is introduced (that is, the frequency feedforward signal ωffd is added as shown in the embodiment in FIG. 5), the output active power P basically does not vary as compared with FIG. 6(a) even though the grid frequency ωg varies. In view of this, adding the frequency feedforward signal ωffd to the active power control unit 120 allows the output current or active power of the inverter not to be affected by the variations of the grid frequency ωg, but still can track the power commands well so that the demand control mode has good robustness against fluctuations of grid frequency ωg.

An additional description is provided with reference to FIG. 5. The present application further discloses an active power control circuit. The active power control circuit comprises the driving torque generating unit 121, the first superposition unit 122, the first integrating unit 1/(Js), the adjustment unit 126, and the second integrating unit 1/s. The driving torque generating unit 121 is configured to receive the active power setting signal Pset and divide the active power setting signal Pset by the angular frequency signal ωn to generate the driving torque command signal Tm. The first superposition unit 122 is configured to receive the driving torque command signal Tm, the torque signal Te, and the torque correcting signal ΔT to generate the acceleration signal Sa. The first integrating unit 1/(Js) is configured to receive the acceleration signal Sa to generate the first frequency control signal ω1. The adjustment unit 126 is configured to receive the frequency feedforward signal ωffd to output the control signal reflecting the output voltage frequency of the inverter ωe based on the frequency feedforward signal ωffd and the first frequency control signal ω1. The second integrating unit 1/s is configured to receive the control signal reflecting the output voltage frequency of the inverter ωe to generate the angle control signal reflecting the output voltage phase of the inverter θe.

Figure 7:
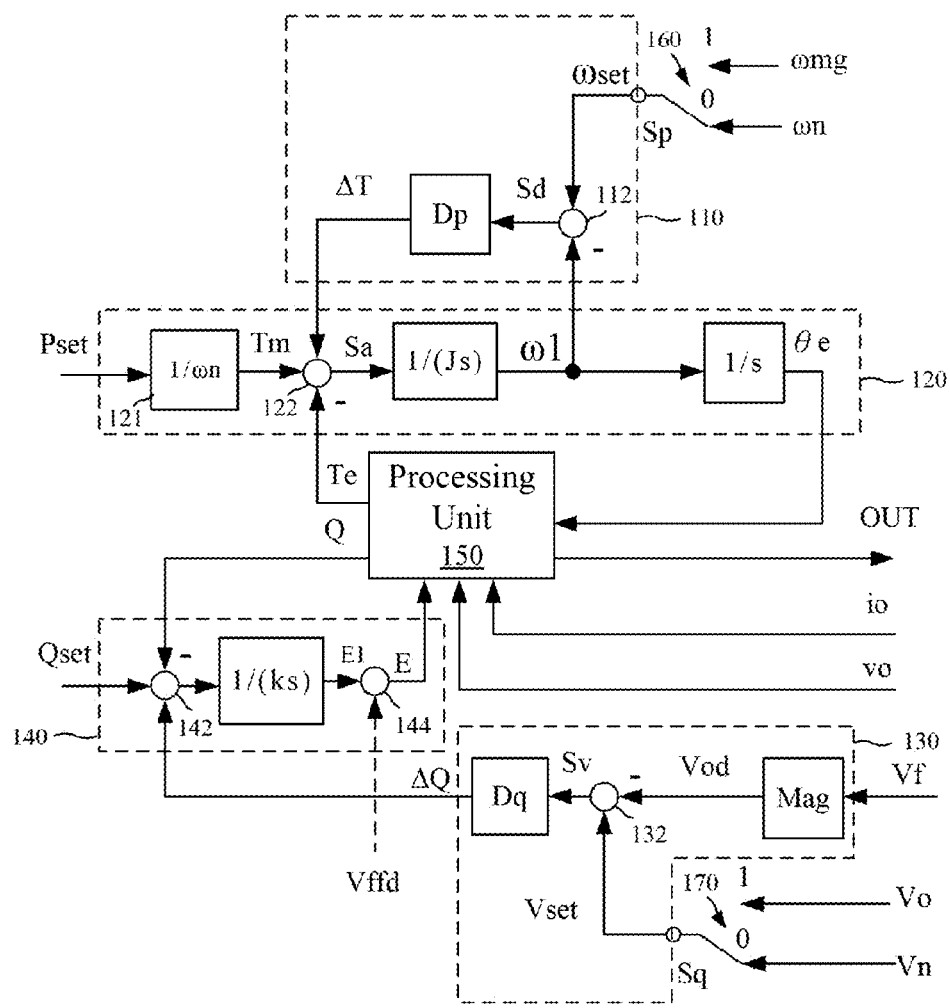
FIG. 7 depicts a circuit schematic diagram of the inverter control device in FIG. 1 in detail according to another embodiment of this application.

FIG. 7 depicts a circuit schematic diagram of the inverter control device 100 in FIG. 1 in detail according to another embodiment of this application. As compared with the inverter control device 100a shown in FIG. 2, the reactive power control unit 140 of an inverter control device 100d further comprises an adjustment unit 144 and the adjustment unit 144 is configured to receive a voltage feedforward signal Vffd and adjust the control signal reflecting the output voltage amplitude of the inverter E based on the voltage feedforward signal Vffd and the reactive power deviation signal.

Figure 8:
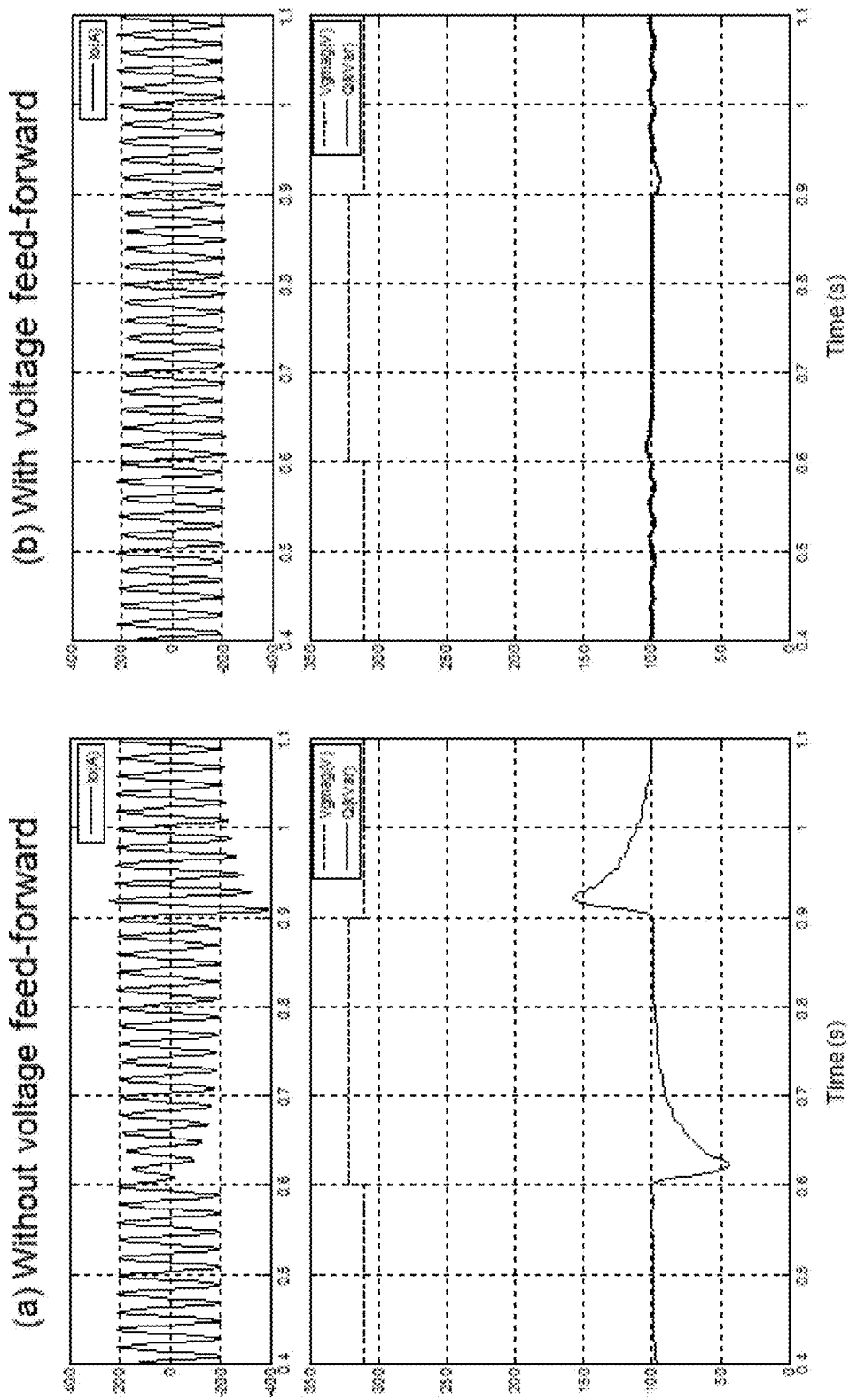
FIG. 8(a) and FIG. 8(b) depict schematic diagrams of dynamic response curves of a reactive power of an inverter when a grid voltage amplitude fluctuates respectively before and after disposing a voltage feedforward unit or an excitation feedforward unit.

FIG. 8(a) and FIG. 8(b) depict schematic diagrams of dynamic response curves of a reactive power of an inverter when a grid voltage amplitude fluctuates respectively before and after disposing a voltage feedforward unit. When the reactive power control unit is in the demand operation mode, it is usually required that the device can stably track the reactive power commands dispatched by the upper-level control system. However, whenever the amplitude of the grid voltage varies, the current or reactive power output of the control device in the prior art will deviate from the commands, and even causes the inverter to overload or shutdown due to failure caused by the overcurrent. In the embodiment shown in FIG. 7, introducing the voltage feedforward signal Vffd into the reactive power control unit 140 allows the demand control mode to have good robustness (or called stability) against amplitude fluctuations of grid voltage. FIG. 8(a) and FIG. 8(b) are dynamic responses of an output current and a reactive power of an inverter when a grid voltage amplitude varies, and a voltage amplitude of an analog grid increases by a step of 10V respectively in FIG. 8(a) and FIG. 8(b). As for the control device in FIG. 8(a) in which the voltage feedforward signal Vffd is not introduced, the output current or reactive power fluctuates corresponding to variations of a grid voltage amplitude. For example in FIG. 8(a), the output reactive power Q varies up and down correspondingly following variations of the grid voltage. As for the control device in FIG. 8(b) in which the voltage feedforward signal Vffd is introduced (that is, the voltage feedforward signal Vffd is added as shown in the embodiment in FIG. 7), the output reactive power Q basically does not vary as compared with FIG. 8(a) even though the grid voltage amplitude varies. In view of this, adding the voltage feedforward signal Vffd to the reactive power control unit 140 allows the output current or reactive power of the inverter not to be affected by the variations of the grid voltage amplitude, but still can track the power commands well so that the demand control mode has good robustness against fluctuations of grid voltage amplitude.

An additional description is provided with reference to FIG. 7. The present application further discloses a reactive power control circuit. The reactive power control unit comprises the reactive deviation generating unit 142, the voltage adjustment unit 1/(ks), and the adjustment unit 144. The reactive deviation generating unit 142 is configured to receive the reactive power setting signal Qset, the signal reflecting the reactive power of the inverter Q, and the signal reflecting the reactive power correcting signal ΔQ to generate the reactive power deviation signal. The voltage adjustment unit 1/(ks) is configured to receive the reactive power deviation signal to generate a first amplitude control signal reflecting the output voltage amplitude of the inverter E1. The adjustment unit 144 is configured to receive the voltage feedforward signal Vffd and the first amplitude control signal reflecting the output voltage amplitude of the inverter E1 to output the voltage amplitude control signal reflecting the output voltage amplitude of the inverter E.

Figure 9:
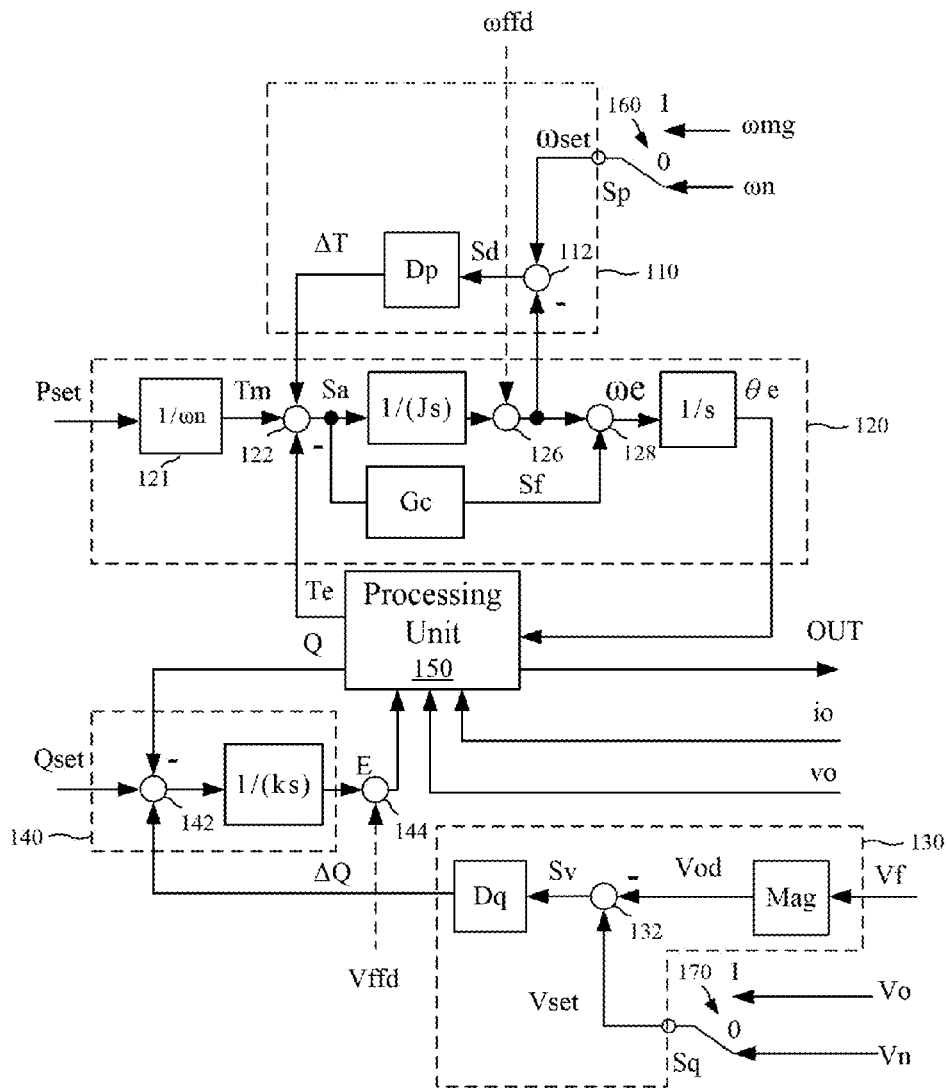
FIG. 9 depicts a circuit schematic diagram of the inverter control device in FIG. 1 in detail according to still another embodiment of this application.

FIG. 9 depicts a circuit schematic diagram of the inverter control device 100 in FIG. 1 in detail according to still another embodiment of this application. It is noted that an inverter control device 100e in FIG. 9 is formed by integrating the inverter control devices 100b-100d shown in FIG. 3, FIG. 5, and FIG. 7. In greater detail, the inverter control device 100e in FIG. 9 is formed by integrating the feedforward computation unit Gc technology in FIG. 3, the frequency feedforward signal ωffd technology in FIG. 5, and the voltage feedforward signal Vffd technology in FIG. 7 together. Since the operation method of the inverter control device 100e in FIG. 9 has been disclosed in the illustration for FIG. 3 to FIG. 8, a description in this regard is not provided. In addition, the present application is not limited to the inverter control device 100e shown in FIG. 9, which only serves as an example for illustrating the overall integration mode of the feedforward technologies shown in FIG. 3, FIG. 5, and FIG. 7. When realizing the present application, each two of the feedforward technologies shown in FIG. 3, FIG. 5, and FIG. 7 may be integrated depending on practical requirements. For example, the feedforward computation unit Gc technology in FIG. 3 and the frequency feedforward signal ωffd technology in FIG. 5 are integrated. Or, the feedforward computation unit Gc technology in FIG. 3 and the voltage feedforward signal Vffd technology in FIG. 7 are integrated. Or, the frequency feedforward signal ωffd technology in FIG. 5 and the voltage feedforward signal Vffd technology in FIG. 7 are integrated.

Figure 10:
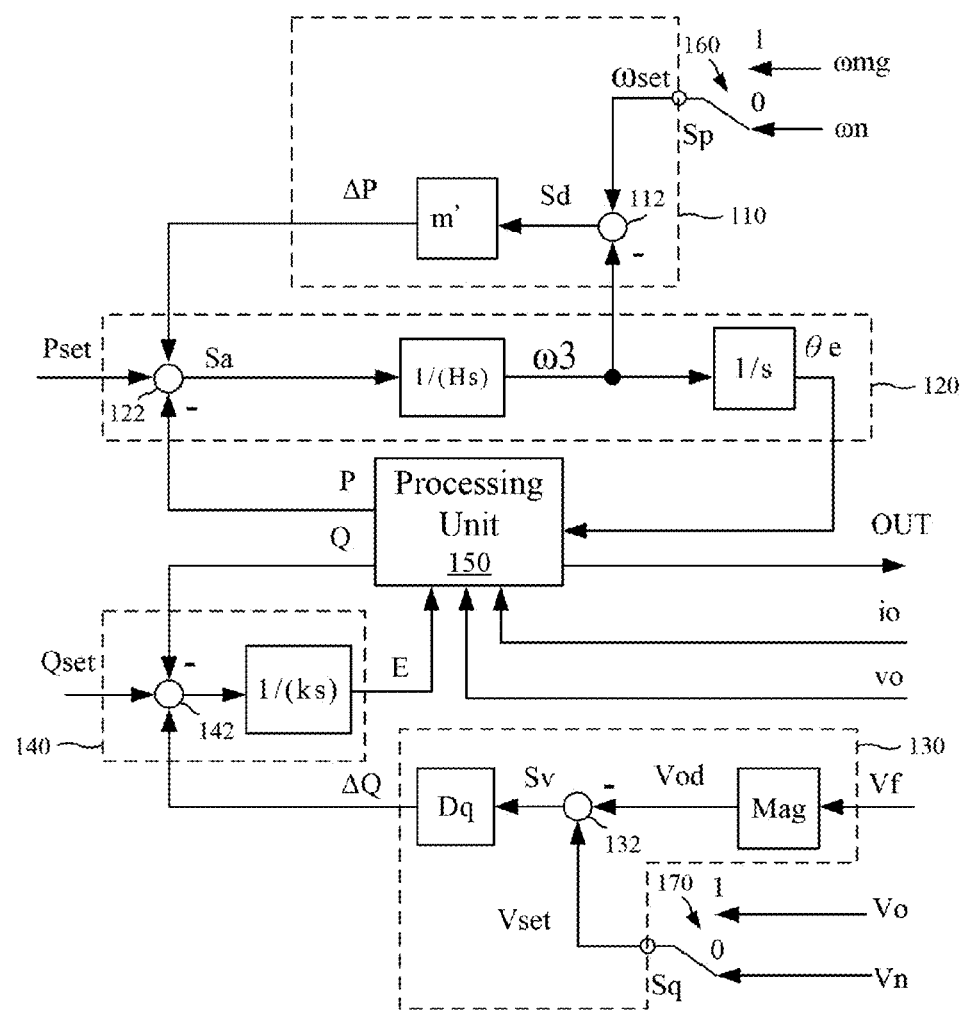
FIG. 10 depicts a circuit schematic diagram of the inverter control device in FIG. 1 in detail according to yet another embodiment of this application.

FIG. 10 depicts a circuit schematic diagram of the inverter control device 100 in FIG. 1 in detail according to yet another embodiment of this application. Different from FIG. 2, the inverter control device 100 directly adopts the active power signal rather than calculates the torque signal. Different from the embodiment shown in FIG. 1, the active power control unit 120 of an inverter control device 100i comprises a superposition unit 122, a third integrating unit 1/(Hs), and the second integrating unit 1/s according to the present embodiment. The superposition unit 122 is configured to receive the signal reflecting the active power correcting signal ΔP, the active power setting signal Pset, and the signal reflecting the active power of the inverter P to generate the acceleration signal Sa. The third integrating unit 1/(H s) is configured to receive the acceleration signal Sa to generate a third frequency control signal ω3. The second integrating unit 1/s is configured to receive the third frequency control signal ω3 to generate the angle control signal reflecting the output voltage phase of the inverter θe.

As shown in FIG. 10, the first correcting-signal providing unit 110 of an inverter control device 100i comprises the first correcting-signal generating unit 112 and a proportion unit m'. m' is a gain of the proportion unit reflecting the droop characteristic of the active power–the output voltage frequency. In some embodiments, when m' is equal to Dpωn and H is equal to Jωn, the active power control units in FIG. 10 and FIG. 2 are equivalent. The first correcting-signal generating unit 112 is configured to receive the third frequency control signal ω3 and the frequency setting signal ωset to generate the frequency deviation signal Sd. The proportion unit m' is configured to receive the frequency deviation signal Sd to generate the signal reflecting the active power correcting signal ΔP.

Figure 11:
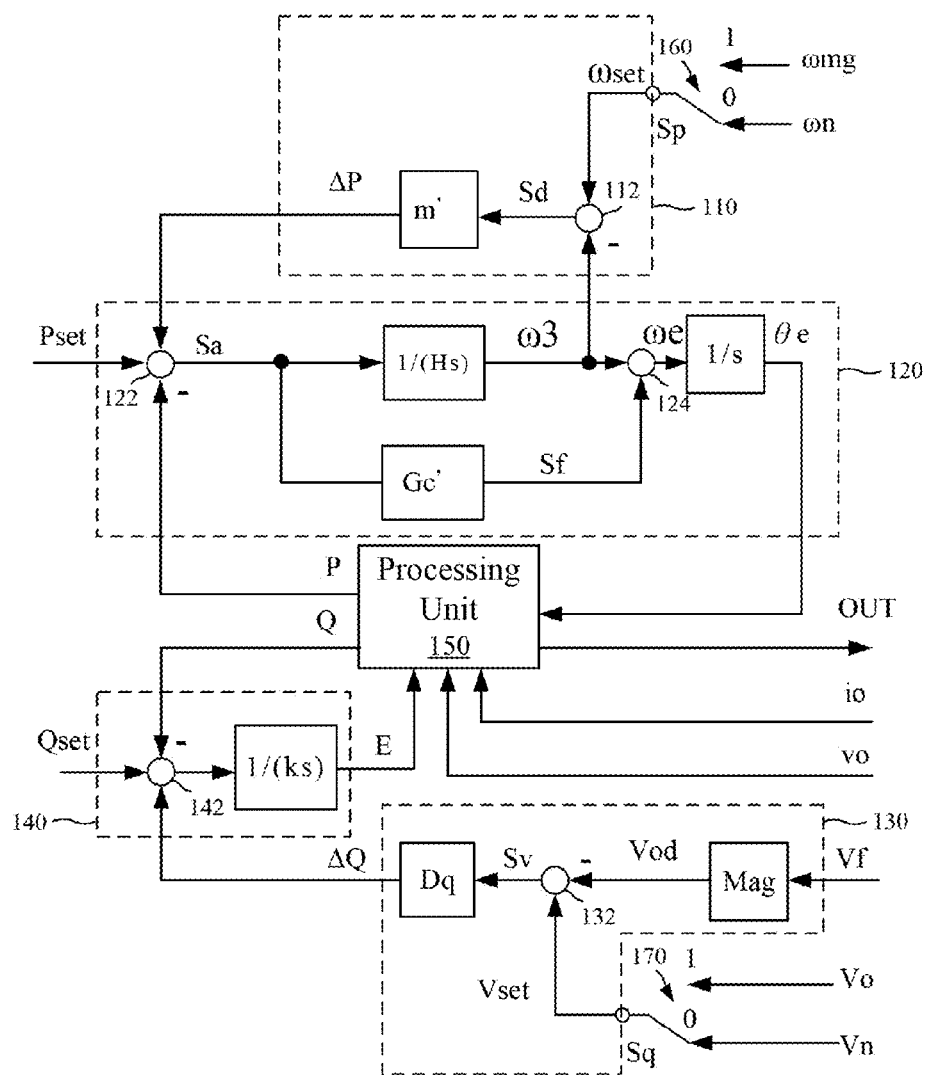
FIG. 11 depicts a circuit schematic diagram of the inverter control device in FIG. 1 in detail according to another embodiment of this application.

FIG. 11 depicts a circuit schematic diagram of the inverter control device 100 in FIG. 1 in detail according to another embodiment of this application. As compared with the inverter control device 100i shown in FIG. 10, the active power control unit 120 of an inverter control device 100j further comprises a feedforward computation unit Gc' and the adjustment unit 124. The feedforward computation unit Gc is configured to receive the acceleration signal Sa to generate a frequency control signal Sf. The adjustment unit 124 is configured to receive the frequency control signal Sf and the third frequency control signal ω3 to generate the control signal reflecting the output voltage frequency of the inverter ωe. The second integrating unit 1/s receives the control signal reflecting the output voltage frequency of the inverter ωe to generate the angle control signal reflecting the output voltage phase of the inverter θe. As mentioned previously, in the embodiment shown in FIG. 11, introducing the feedforward computation unit Gc' into the active power control unit 120 allows users to control the droop slope and dynamic response independently. For example, under different parameter settings of m', the response time of the output active power following the active power setting signal Pset is kept constant.

Figure 12:
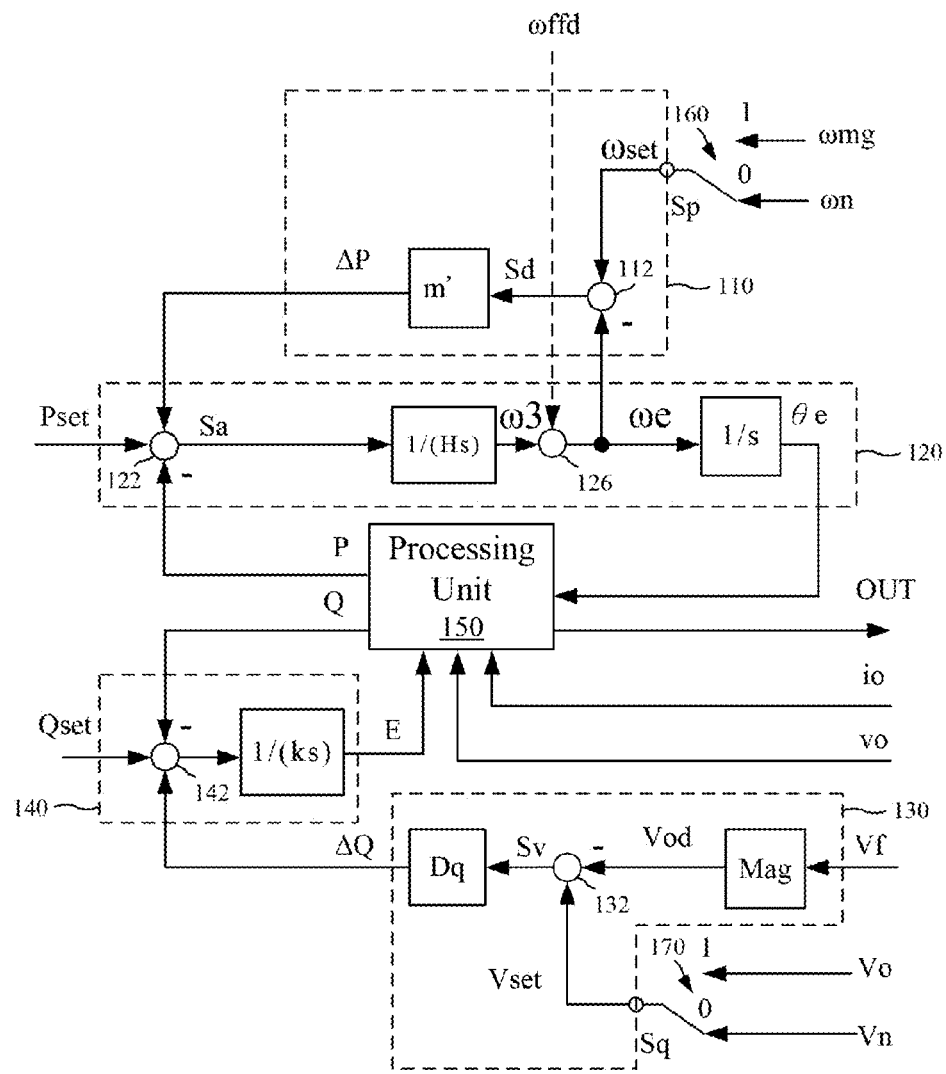
FIG. 12 depicts a circuit schematic diagram of the inverter control device in FIG. 1 in detail according to still another embodiment of this application.

FIG. 12 depicts a circuit schematic diagram of the inverter control device 100 in FIG. 1 in detail according to still another embodiment of this application. As compared with the inverter control device 100i shown in FIG. 10, the active power control unit 120 of an inverter control device 100k further comprises a adjustment unit 126. The adjustment unit 126 is configured to receive the frequency feedforward signal ωffd and output the control signal reflecting the output voltage frequency of the inverter ωe based on the frequency feedforward signal ωffd and the third frequency control signal ω3. The second integrating unit 1/s receives the control signal reflecting the output voltage frequency or the inverter ωe to generate the angle control signal reflecting the output voltage phase of the inverter θe. As mentioned previously, in the embodiment shown in FIG. 12, introducing the frequency feedforward signal ωffd into the active power control unit 120 allows the output current or active power of the inverter not to be affected by the variations of the grid voltage frequency, but still can track the power commands well so that the demand control mode has good robustness against fluctuations of grid voltage frequency.

Figure 13:
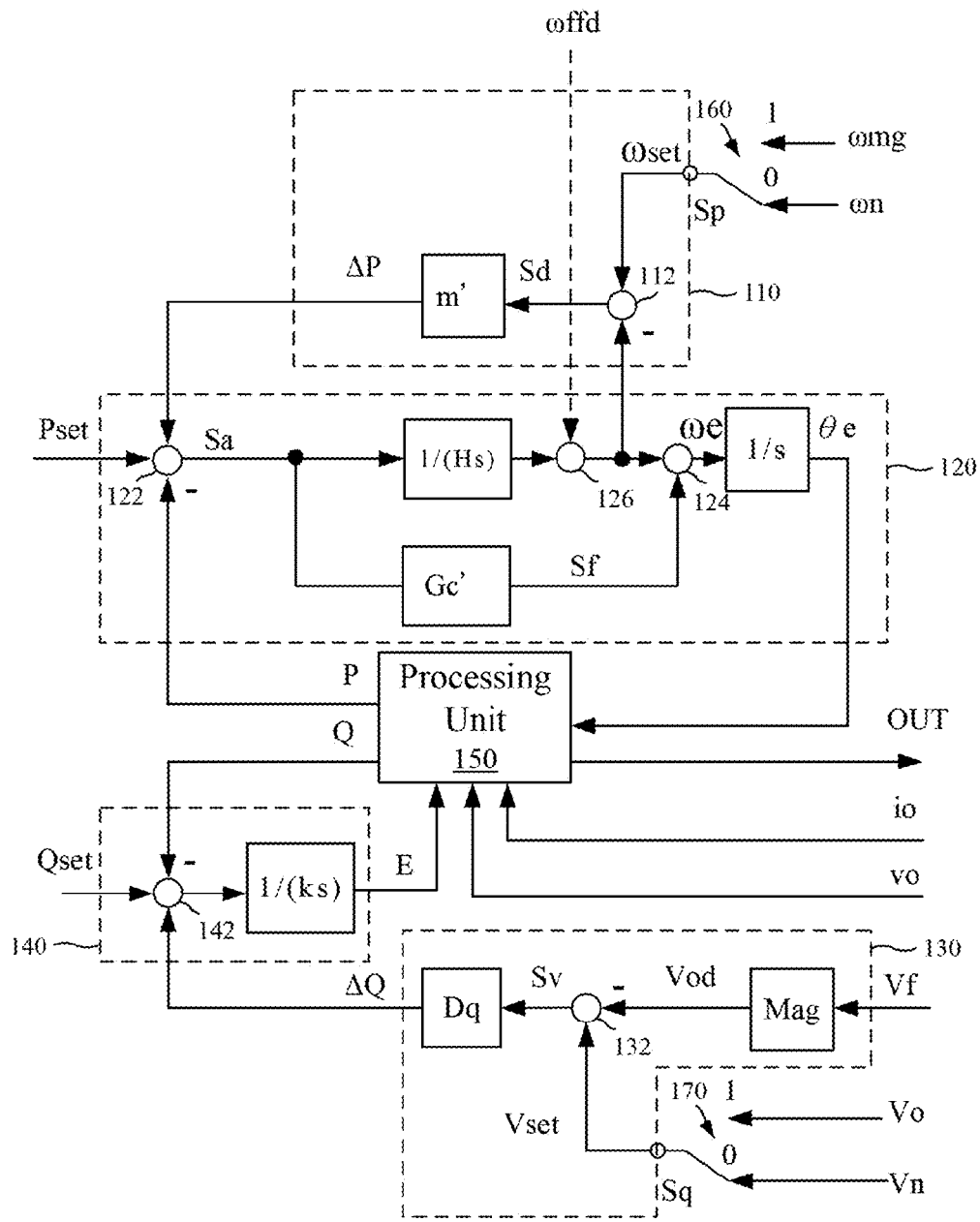
FIG. 13 depicts a circuit schematic diagram of the inverter control device in FIG. 1 in detail according to yet another embodiment of this application.

FIG. 13 depicts a circuit schematic diagram of the inverter control device 100 in FIG. 1 in detail according to yet another embodiment of this application. It is noted that the inverter control device 100l in FIG. 13 is formed by integrating the inverter control devices 100j-100k shown in FIG. 11-FIG. 12. In greater detail, the inverter control device 100l in FIG. 13 is formed by integrating the feedforward computation unit Gc technology in FIG. 11 and the frequency feedforward signal ωffd technology in FIG. 12 together. Since the operation method of the inverter control device 100l in FIG. 13 has been disclosed in the illustration for FIG. 11-FIG. 12, a description in this regard is not provided.

Figure 14:
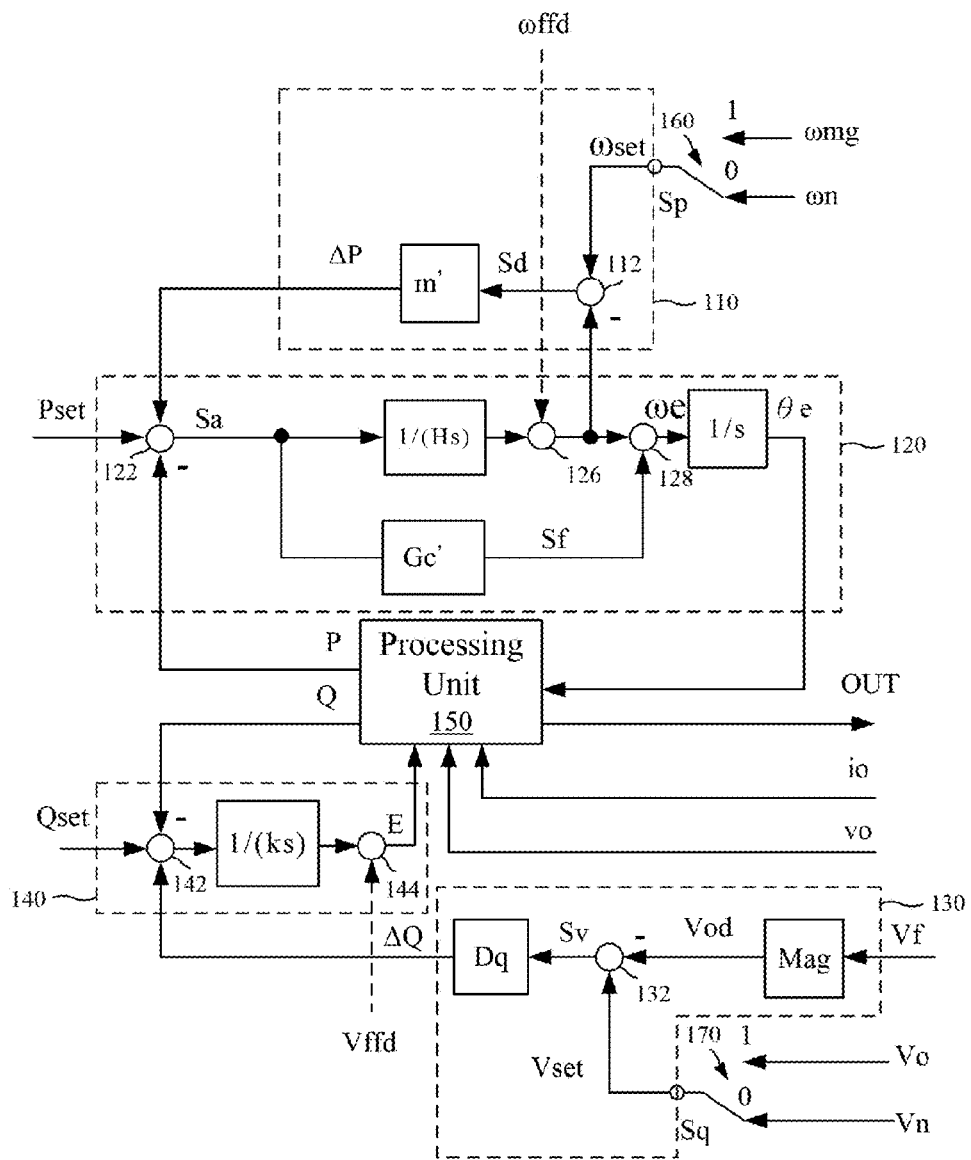
FIG. 14 depicts a circuit schematic diagram of the inverter control device in FIG. 1 in detail according to another embodiment of this application.

FIG. 14 depicts a circuit schematic diagram of the inverter control device 100 in FIG. 1 in detail according to another embodiment of this application. As compared with the inverter control device 100l shown in FIG. 13, except for the reactive deviation generating unit 142 and the voltage adjustment unit 1/(ks), the reactive power control unit 140 of an inverter control device 100m further comprises a adjustment unit 144. The reactive deviation generating unit 142 is configured to receive the reactive power setting signal Qset, the signal reflecting the reactive power of the inverter Q, and the signal reflecting the reactive power correcting signal ΔQ to generate the reactive power deviation signal. The voltage adjustment unit 1/(ks) is configured to receive the reactive power deviation signal to generate a first amplitude control signal reflecting the output voltage amplitude of the inverter. The adjustment unit 144 is configured to receive the voltage feedforward signal vffd and output the control signal reflecting the output voltage amplitude of the inverter E based on the voltage feedforward signal vffd and the first amplitude control signal reflecting the output voltage amplitude of the inverter from the voltage adjustment unit 1/(ks).

Figure 15:
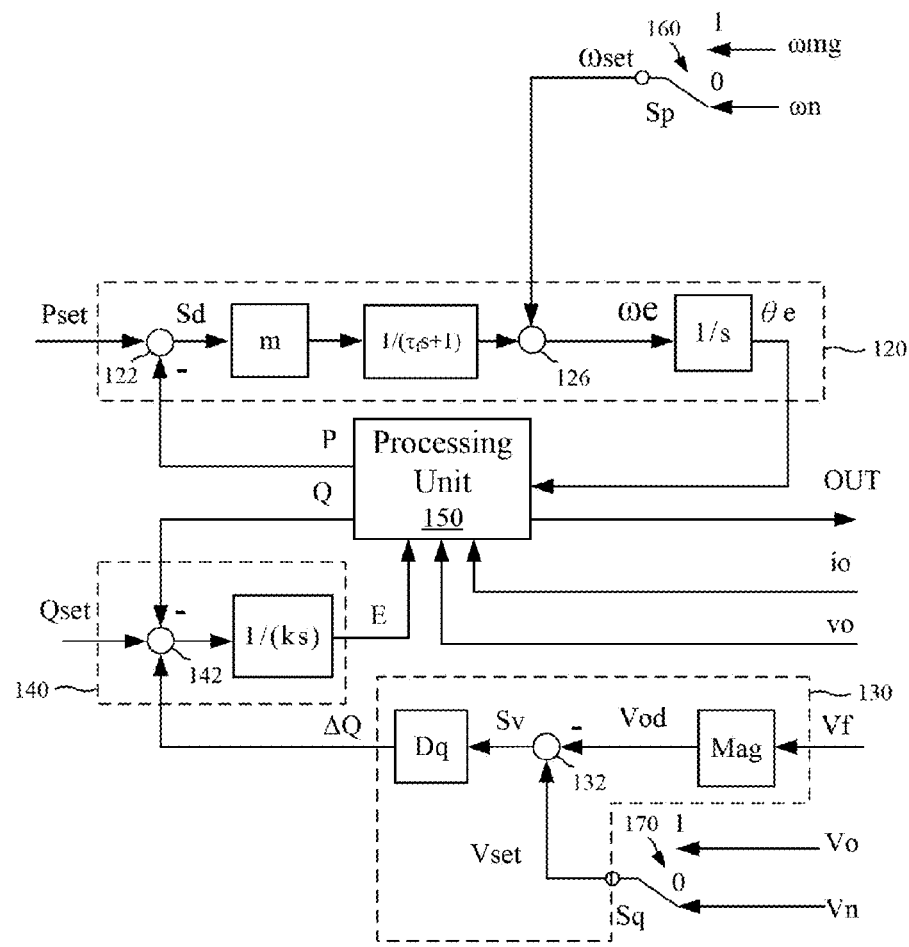
FIG. 15 depicts a schematic diagram of an inverter control device according to still another embodiment of this application.

FIG. 15 depicts a schematic diagram of an inverter control device 100n according to still another embodiment of this application. As shown in the figure, an inverter control device 100n comprises the active power control unit 120, a correcting-signal providing unit 130, the reactive power control unit 140, and the processing unit 150. The active power control unit 120 comprises a superposition unit 122, a proportion unit m, a filter unit, the adjustment unit 126, and the integrating unit 1/s. In one embodiment, the filter unit may be a low-pass filter $1/(\tau_f s+1)$, and a time constant of the low-pass filter is $\tau_f$.

In operation, the superposition unit 122 is configured to receive the active power setting signal Pset and the signal reflecting the active power of the inverter P to generate an acceleration signal. The proportion unit in has a first proportional gain for reflecting the active power droop characteristic of the inverter. The proportion unit m is configured to receive the acceleration signal and output a frequency signal corresponding to the acceleration signal. The low-pass filter $1/(\tau_f s+1)$ is serially connected to the proportion unit m and is configured to filter the frequency signal to obtain a first frequency control signal. The adjustment unit 126 is configured to receive the first frequency control signal and the frequency setting signal ωset to generate a second frequency control signal ωe. The integrating unit 1/s is configured to receive the second frequency control signal ωe to generate the angle control signal reflecting the output voltage phase of the inverter θe.

In addition, the correcting-signal providing unit 130 is configured to receive the voltage setting signal Vset and provide the signal reflecting the reactive power correcting signal ΔQ. The reactive power control unit 140 is configured to receive the signal reflecting the reactive power correcting signal ΔQ, the reactive power setting signal Qset, and the signal reflecting the reactive power of the inverter Q so as to generate the control signal reflecting the output voltage amplitude of the inverter E. The processing unit 150 is coupled to the active power control unit 120 and the reactive power control unit 140 and is configured to receive the feedback signal reflecting the output current of the inverter io, the feedback signal reflecting the output voltage of the inverter vo, the angle control signal reflecting the output voltage phase of the inverter θe, the control signal reflecting the output voltage amplitude of the inverter E so as to generate the signal reflecting the active power of the inverter P, the signal reflecting the reactive power of the inverter Q, and the voltage command signal OUT. It is noted that, since the internal configurations and operation methods of the first selection unit 160, the second selection unit 170, the correcting-signal providing unit 130, and the reactive power control unit 140 of the inverter control device 100n in FIG. 15 are similar to those of the inverter control device 100a shown in FIG. 2, a description in this regard is not provided.

Figure 16:
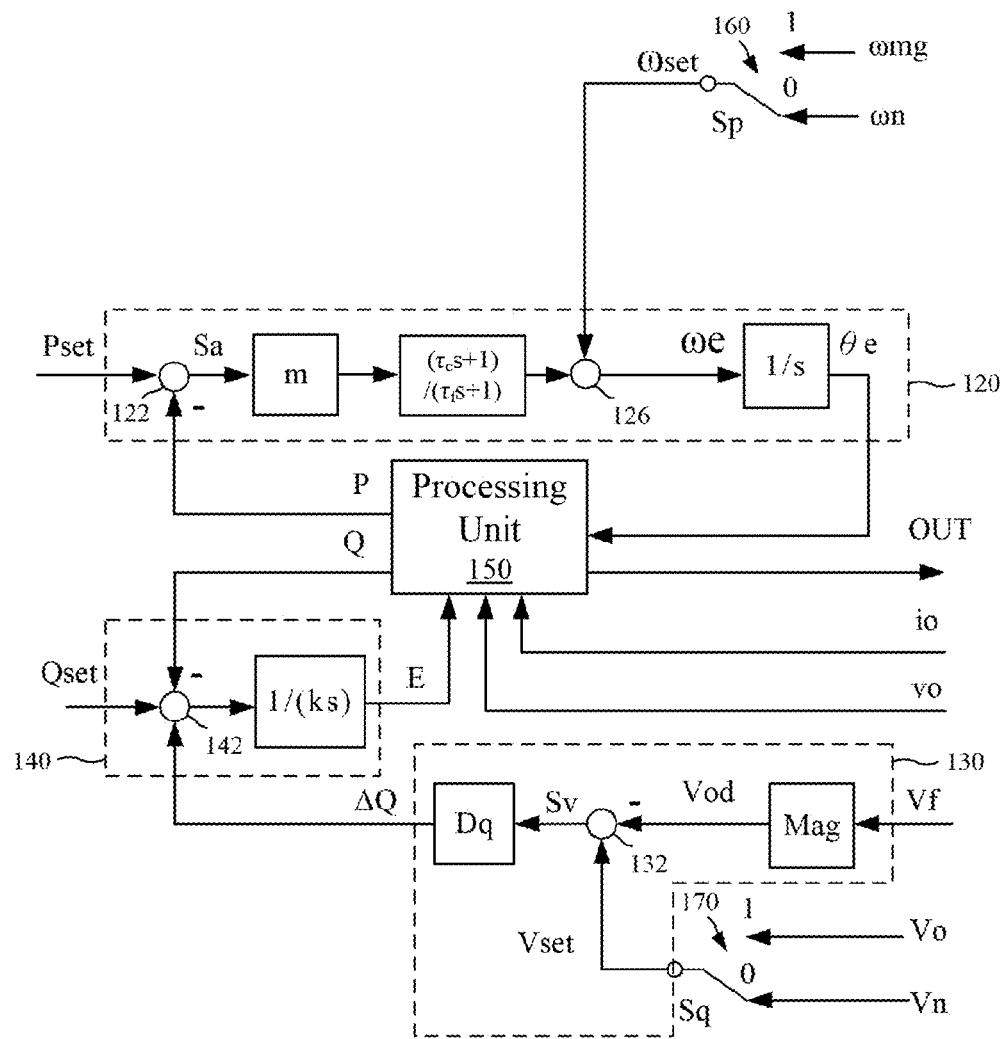
FIG. 16 depicts a schematic diagram of an inverter control device according to yet another embodiment of this application.

FIG. 16 depicts a schematic diagram of an inverter control device 100o according to yet another embodiment of this application. As shown in the figure, an inverter control device 100o comprises the active power control unit 120, the correcting-signal providing unit 130, the reactive power control unit 140, and the processing unit 150. The active power control unit 120 comprises the superposition unit 122, the proportion unit m, the filter unit, the adjustment unit 126, and the integrating unit 1/s. In one embodiment, the filter unit may be a lead-lag correcting unit $(\tau_c s+1)/(\tau_f s+1)$ and a pole of the lead-lag correcting unit $(\tau_c s+1)/(\tau_f s+1)$ is $1/\tau_f$, a zero point of the lead-lag correcting unit $(\tau_c s+1)/(\tau_f s+1)$ is $1/\tau_c$.

In operation, the superposition unit 122 is configured to receive the active power setting signal Pset and the signal reflecting the active power of the inverter P to generate the acceleration signal Sa. The proportion unit m has the first proportional gain for reflecting the active power droop characteristic of the inverter. The proportion unit m is configured to receive the acceleration signal Sa and output the frequency signal corresponding to the acceleration signal. The lead-lag correcting unit $(\tau_c s+1)/(\tau_f s+1)$ is serially connected to the proportion unit m and filters the frequency signal to obtain the first frequency control signal. The adjustment unit 126 is configured to receive the first frequency control signal and the frequency setting signal ωset to generate the second frequency control signal ωe. The integrating unit 1/s is configured to receive the second frequency control signal ωe to generate the angle control signal reflecting the output voltage phase of the inverter θe.

In addition, the correcting-signal providing unit 130 is configured to receive the voltage setting signal Vset and provide the signal reflecting the reactive power correcting signal ΔQ. The reactive power control unit 140 is configured to receive the signal reflecting the reactive power correcting signal ΔQ, the reactive power setting signal Qset, and the signal reflecting the reactive power of the inverter Q so as to generate the control signal reflecting the output voltage amplitude of the inverter E. The processing unit 150 is coupled to the active power control unit 120 and the reactive power control unit 140 and is configured to receive the feedback signal reflecting the output current of the inverter io, the feedback signal reflecting the output voltage of the inverter vo, the angle control signal reflecting the output voltage phase of the inverter θe, the control signal reflecting the output voltage amplitude of the inverter E so as to generate the signal reflecting the active power of the inverter P, the signal reflecting the reactive power of the inverter Q, and the voltage command signal OUT. It is noted that, since the internal configurations and operation methods of the first selection unit 160, the second selection unit 170, the correcting-signal providing unit 130, and the reactive power control unit 140 of the inverter control device 100o in FIG. 16 are similar to those of the inverter control device 100a shown in FIG. 2, a description in this regard is not provided.

Figure 17:
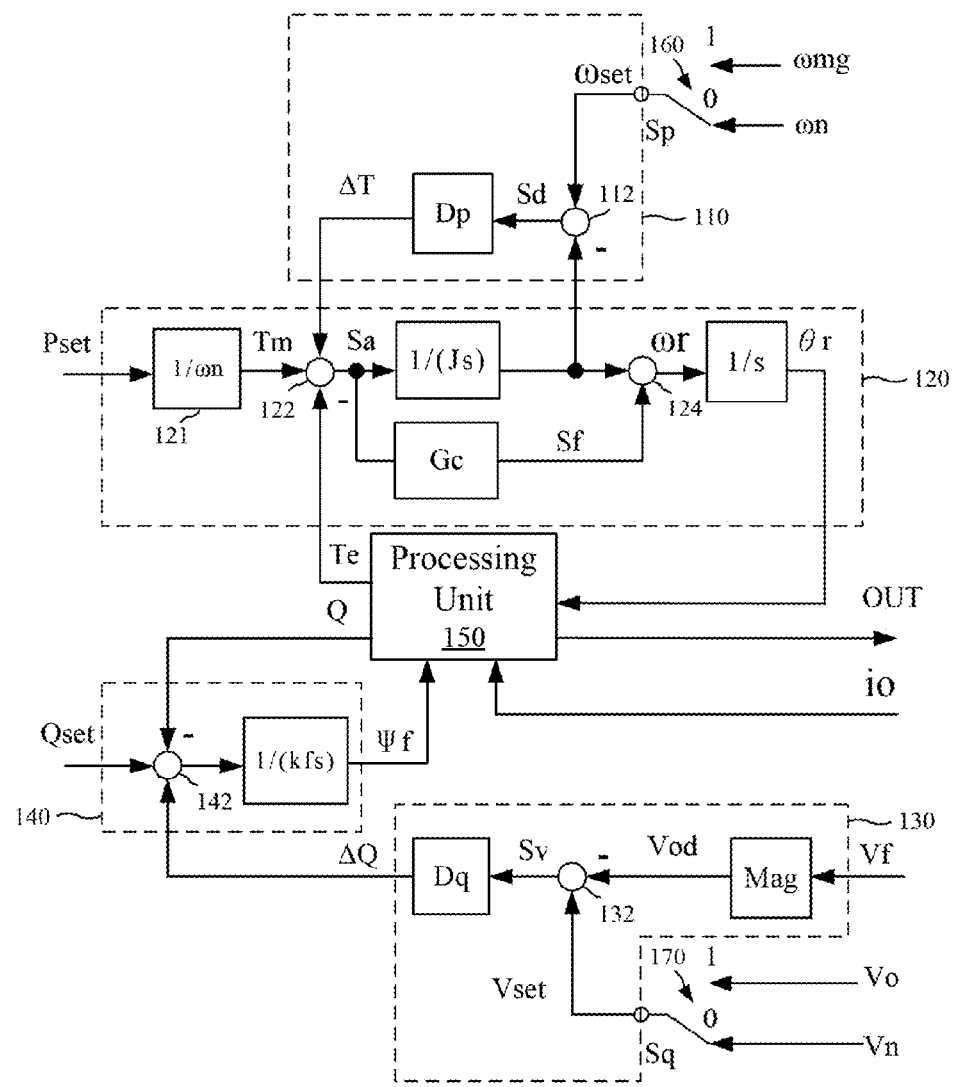
FIG. 17 depicts a schematic diagram of an inverter control device according to another embodiment of this application.

FIG. 17 depicts a schematic diagram of an inverter control device 100f according to another embodiment of this application. As shown in the figure, an inverter control device 100f comprises the first correcting-signal providing unit 110, the active power control unit 120, the second correcting-signal providing unit 130, the reactive power control unit 140, and the processing unit 150. In operation, the first correcting-signal providing unit 110 is configured to provide the signal reflecting the active power correcting signal ΔP. The active power control unit 120 is configured to receive and calculate the signal reflecting the active power correcting signal ΔP, the active power setting signal Pset, and the signal reflecting the active power of the inverter P so as to generate an angel control signal reflecting the output voltage phase of the inverter θr. The second correcting-signal providing unit 130 is configured to provide the signal reflecting the reactive power correcting signal ΔQ. The reactive power control unit 140 is configured to receive and calculate the signal reflecting the reactive power correcting signal ΔQ, the reactive power setting signal Qset, and the signal reflecting the reactive power of the inverter Q so as to generate a virtual excitation control signal Ψf. The processing unit 150 is coupled to the active power control unit 120 and the reactive power control unit 140 and is configured to receive and calculate the feedback signal reflecting an output current of the inverter io, the angel control signal reflecting the output voltage phase of the inverter θr, and the virtual excitation control signal Ψf so as to generate the signal reflecting the active power of the inverter P, the signal reflecting the reactive power of the inverter Q, and the voltage command signal OUT.

A description is provided with reference to FIG. 17. In one embodiment, the reactive power control unit 140 comprises the reactive deviation generating unit 142 and an excitation adjustment unit 1/(kfs). The reactive deviation generating unit 142 is configured to receive the signal reflecting the reactive power correcting signal ΔQ, the reactive power setting signal Qset, and the signal reflecting the reactive power of the inverter Q to generate the reactive power deviation signal. The excitation adjustment unit (may be integral or proportional integral) 1/(kfs) is configured to receive the reactive power deviation signal to generate the virtual excitation control signal Ψf.

A description is provided with reference to FIG. 17. In another embodiment, the signal reflecting the active power of the inverter P is a virtual torque signal Te. The signal reflecting the active power correcting signal ΔP is the torque correcting signal ΔT. The active power control unit 120 comprises a driving torque generating unit 1/ωn, the superposition unit 122, a second integrating unit 1/(Js), and a third integrating unit 1/s. In operation, the driving torque generating unit 1/ωn is configured to receive the active power setting signal Pset and divide the active power setting signal Pset by the angular frequency signal ωn to generate a driving torque signal Tm. The superposition unit 122 is configured to receive and calculate the driving torque signal Tm, the virtual torque signal Te, and the torque correcting signal ΔT to generate the acceleration signal Sa. The second integrating unit 1/(Js) is configured to receive and integrate the acceleration signal Sa to generate a angular frequency control signal ωr. The third integrating unit 1/s is configured to receive and integrate the angular frequency control signal (or to generate the angle control signal reflecting the output voltage phase of the inverter θr.

A description is provided with reference to FIG. 17. Calculation methods for various output parameters of the processing unit 150 are exemplified. The output parameters of the processing unit 150 comprises the voltage command signal OUT, the virtual torque signal Te, and the signal reflecting the reactive power of the inverter Q.

First, the calculation formula for the voltage command signal OUT is as follows:

$$e^* = \omega_n \Psi_f \angle (\theta_r + \pi/2) \qquad \text{formula 5}$$

As shown in formula 5, the processing unit 150 calculates the voltage command signal OUT based on the angular frequency signal ωn which reflects the angular frequency of the system, the virtual excitation control signal Ψf which reflects the output voltage amplitude of the inverter, and the angle control signal reflecting the output voltage phase of the inverter θe. The voltage command signal OUT may be the AC voltage command signal e*.—The angular frequency signal ωn which reflects the angular frequency of the system may be the rated angular frequency or the angular frequency control signal ωr which reflects the current output angular frequency of the inverter.

Second, the calculation formula for the virtual torque signal Te is as follows:

$$T_e = i_o \otimes \overline{\Psi}_f \qquad \text{formula 6}$$

As shown in formula 6, the processing unit 150 calculates the virtual torque signal Te which reflects the active power of the inverter based on a cross product of the feedback signal reflecting the output current of the inverter io and the virtual excitation control signal Ψf, wherein $\overline{\Psi}_f = \Psi_f \angle \theta_r$.

Additionally, the calculation formula for the signal reflecting the reactive power of the inverter Q is as follows:

$$Q = e^* \otimes i_o \qquad \text{formula 7}$$

As shown in formula 7, the processing unit 150 calculates the signal reflecting the reactive power of the inverter Q based on a cross product of the AC voltage command signal e* and the feedback signal reflecting the output current of the inverter io.

A description is provided with reference to FIG. 17. In yet another embodiment, the active power control unit 120 further comprises the feedforward computation unit Gc and the adjustment unit 124. The feedforward computation unit Gc is configured to receive and calculate the acceleration signal Sa to generate the frequency control signal Sf. The adjustment unit 124 is configured to receive the frequency control signal Sf to adjust the angular frequency control signal ωr and the angle control signal reflecting the output voltage phase of the inverter θr.

A description is provided with reference to FIG. 17. In still another embodiment, the first correcting-signal providing unit 110 comprises the first correcting-signal generating unit 112 and the first proportion unit Dp. The first correcting-signal generating unit 112 is configured to receive and calculate the angular frequency control signal ωr and the frequency setting signal ωset to generate the frequency deviation signal Sd. The first proportion unit Dp is configured to receive and calculate the frequency deviation signal Sd to generate the torque correcting signal ΔT.

A description is provided with reference to FIG. 17. In another embodiment, the second correcting-signal providing unit 130 comprises the amplitude computation unit Mag, the second correcting-signal generating unit 132, and the second proportion unit Dq. The amplitude computation unit Mag is configured to calculate the amplitude signal Vod based on the feedback signal of the output voltage of the inverter Vf. The second correcting-signal generating unit 132 is configured to receive the amplitude signal Vod and the voltage setting signal Vset and compare the amplitude signal Vod with the voltage setting signal Vset to generate a voltage deviation signal Sv. The second proportion unit Dq is configured to receive and calculate the voltage deviation signal Sv to generate the signal reflecting the reactive power correcting signal ΔQ.

Figure 18:
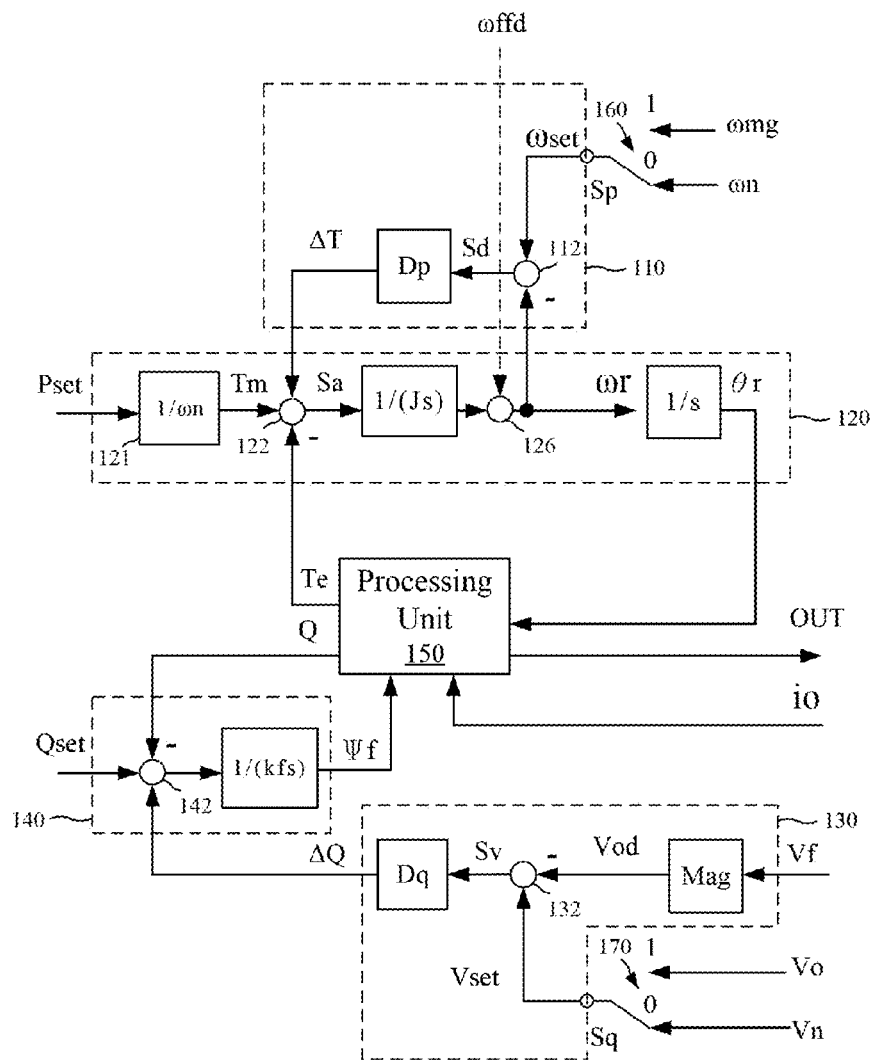
FIG. 18 depicts a schematic diagram of an inverter control device according to still another embodiment of this application.

FIG. 18 depicts a schematic diagram of an inverter control device 100g according to still another embodiment of this application. As compared with the inverter control device 100f shown in FIG. 17, the active power control unit 120 of an inverter control device 100g does not comprise the feedforward computation unit Gc and the adjustment unit 124, rather, the active power control unit 120 of an inverter control device 100g comprises an adjustment unit 126. The adjustment unit 126 is configured to receive the frequency feedforward signal ωffd to adjust the angular frequency control signal ωr, and the angle control signal reflecting the output voltage phase of the inverter θr is output by the integrating unit 1/s.

Figure 19:
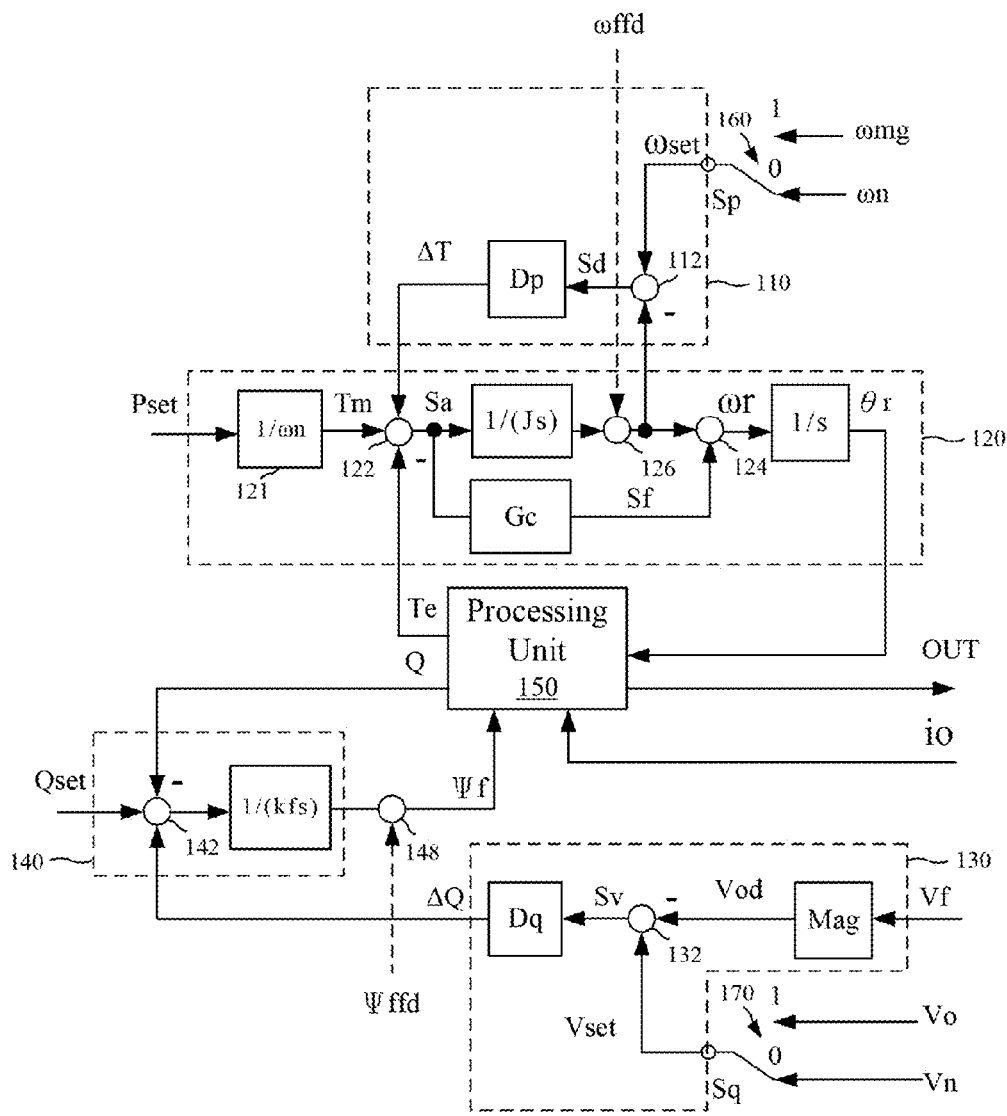
FIG. 19 depicts a schematic diagram of an inverter control device according to yet another embodiment of this application.

FIG. 19 depicts a schematic diagram of an inverter control device 100h according to yet another embodiment of this application. It is noted that an inverter control device 100h shown in FIG. 19 is formed by integrating the inverter control devices 100f-100g shown in FIG. 17-FIG. 18. In greater detail, the inverter control device 100h in FIG. 19 is formed by integrating the feedforward computation unit Gc technology in FIG. 17 and the frequency feedforward signal ωffd technology in FIG. 18. As shown in FIG. 19, the active power control unit 120 of the inverter control device 100h comprises the adjustment unit 126, the feedforward computation unit Gc, and the adjustment unit 124. The adjustment unit 126 is configured to receive the frequency feedforward signal ωffd and a first frequency control signal output by an integrating unit 1/Js to generate a third frequency control signal. The feedforward computation unit Gc is configured to receive and calculate the acceleration signal Sa to generate the frequency control signal Sf. The adjustment unit 124 is configured to receive the frequency control signal Sf and the third frequency control signal to output the control signal ωr which reflects the output voltage frequency of the inverter. The integrating unit 1/s receives the control signal which reflects the output voltage frequency of the inverter to generate the angle control signal reflecting the output voltage phase of the inverter θe.

A description is provided with reference to FIG. 19. The reactive power control unit 140 of the inverter control device 100h further comprises an adjustment unit 148. The adjustment unit 148 is configured to receive an excitation feedforward signal Ψffd and adjust the virtual excitation control signal Ψf based on the excitation feedforward signal Ψffd and the reactive power deviation signal. Similar to the principle of the voltage feedforward technology shown in FIG. 7, when the reactive power control unit is in the demand operation mode, it is usually required that the device can stably track the reactive power commands dispatched by the upper-level control system. However, whenever the amplitude of the grid voltage varies, the current or reactive power output by the t control device in the prior art will deviate from the commands, and even cause the inverter to overload or shutdown due to failure caused by the overcurrent. In the embodiment shown in FIG. 19, introducing the excitation feedforward signal Ψffd into the reactive power control unit allows the demand control mode to have good robustness (or called stability) against fluctuations of grid voltage amplitude. FIG. 8(a) and FIG. 8(b) may be referred to for the dynamic response curves of the reactive power of the inverter respectively before and after adopting an excitation feedforward signal. Since the results may be referred to in the illustration for FIG. 8(a) and FIG. 8(b), a description in this regard is not provided. In view of this, adding the excitation feedforward signal Ψffd to the reactive power control unit allows the output current or reactive power of the inverter not to be affected by the variations of the grid voltage amplitude, but still can track the power commands well so that the demand control mode has good robustness against fluctuations of grid voltage amplitude.

Figure 20:
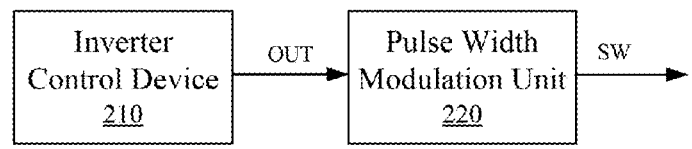
FIG. 20 depicts a schematic diagram of a control signal generating system according to one embodiment of this application.

FIG. 20 depicts a schematic diagram of a control signal generating system 200 according to one embodiment of this application. As shown in the figure, the control signal generating system 200 comprises an inverter control device 210 and a pulse width modulation unit 220. The inverter control device 210 may be any of the inverter control devices 100-100o described in the above embodiments. In operation, the pulse width modulation unit 220 is configured to generate a switch signal SW based on the voltage command signal OUT generated by the inverter control device 210, and control a plurality of switch devices in an inverter based on the switch signal SW.

Figure 21:
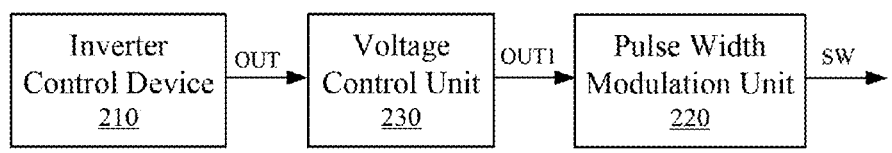
FIG. 21 depicts a schematic diagram of a control signal generating system according to another embodiment of this application.

FIG. 21 depicts a schematic diagram of a control signal generating system 200a according to another embodiment of this application. As compared with the control signal generating system 200 shown in FIG. 20, a control signal generating system 200a further comprises a voltage control unit 230. In operation, the voltage control unit 230 is configured to receive the voltage command signal OUT of the inverter control device 210 and the feedback signal reflecting the output voltage of the inverter vo to perform a closed-loop control based on the voltage command signal OUT and the feedback signal reflecting the output voltage of the inverter vo so as to generate a first voltage command signal OUT1. The pulse width modulation unit 220 generates the switch signal SW based on the first voltage command signal OUT1, and control the plurality of switch devices in the inverter based on the switch signal SW.

Figure 22:
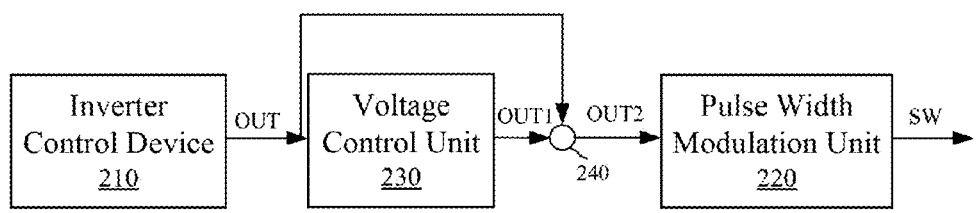
FIG. 22 depicts a schematic diagram of a control signal generating system according to still another embodiment of this application

FIG. 22 depicts a schematic diagram of a control signal generating system 200b according to still another embodiment of this application. As compared with the control signal generating system 200a shown in FIG. 21, a control signal generating system 200b further comprises an adjustment unit 240. The adjustment unit 240 is configured to receive the voltage command signal OUT to adjust the first voltage command signal OUT1 so as to generate a second voltage command signal OUT2.

It is understood from the embodiments of the present application, applying the present application has the following advantages. The embodiments of the present application provide a control signal generating system and an inverter control device thereof, which is categorized as a voltage source on-grid technology and is subject to the characteristics of the controlled voltage source (similar to a synchronous generator of a power system) so as to be adjusted when the voltage and frequency of the grid is adjusted. As a result, the grid stability is improved. In addition, the control signal generating system and the inverter control device thereof provided by the embodiments of the present application are compatible with both the on-grid operation mode and the independent operation mode so there is no necessity to switch the control architecture and the load power supply is not interfered with during the off-grid switching process. The seamless switching between the grid and the micro-grid is therefore achieved.

Although the present application has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present application without departing from the scope or spirit of the application. In view of the foregoing, it is intended that the present application cover modifications and variations of this application provided they fall within the scope of the following claims and their equivalents.

What is claimed is:

1. An inverter control device comprising:
a first correcting-signal providing unit configured to receive a frequency setting signal and provide a signal reflecting an active power correcting signal;
an active power control unit configured to receive the signal reflecting the active power correcting signal, an active power setting signal, and a signal reflecting an active power of an inverter to generate an angle control signal reflecting an output voltage phase of the inverter;
a second correcting-signal providing unit configured to receive a voltage setting signal and provide a signal reflecting a reactive power correcting signal;
a reactive power control unit configured to receive the signal reflecting the reactive power correcting signal, a reactive power setting signal, and a signal reflecting a reactive power of the inverter to generate a control signal reflecting an output voltage amplitude of the inverter, wherein the control signal reflecting the output voltage amplitude of the inverter is a voltage amplitude control signal; and
a processing unit configured to receive a feedback signal reflecting an output current of the inverter, a feedback signal reflecting an output voltage of the inverter, the angle control signal reflecting the output voltage phase of the inverter, and the control signal reflecting the output voltage amplitude of the inverter to generate the signal reflecting the active power of the inverter, the signal reflecting the reactive power of the inverter, and a voltage command signal.

2. The inverter control device of claim 1, wherein the signal reflecting the active power of the inverter is a torque signal, and the signal reflecting the active power correcting signal is a torque correcting signal, wherein the active power control unit comprises:
a driving torque generating unit configured to receive the active power setting signal and divide the active power setting signal by an angular frequency signal to generate a torque command signal;
a first superposition unit configured to receive the torque command signal, the torque signal, and the torque correcting signal to generate an acceleration signal; and
a first integrating unit configured to receive the acceleration signal to generate a first frequency control signal.

3. The inverter control device of claim 2, wherein the active power control unit further comprises any of the following groups:
group one: a second integrating unit configured to receive the first frequency control signal to generate the angle control signal reflecting the output voltage phase of the inverter;
group two: a feedforward computation unit configured to receive the acceleration signal to generate a second frequency control signal; a first adjustment unit configured to receive the first frequency control signal and the second frequency control signal to generate a control signal reflecting an output voltage frequency of the inverter; and a second integrating unit configured to receive the control signal reflecting the output voltage frequency of the inverter to generate the angle control signal reflecting the output voltage phase of the inverter;
group three: a second adjustment unit configured to receive a frequency feedforward signal and output a control signal reflecting an output voltage frequency of the inverter based on the frequency feedforward signal and the first frequency control signal; and a second integrating unit configured to receive the control signal reflecting the output voltage frequency of the inverter to generate the angle control signal reflecting the output voltage phase of the inverter;
group four: a feedforward computation unit configured to receive the acceleration signal to generate a second frequency control signal; a second adjustment unit configured to receive a frequency feedforward signal and the first frequency control signal to generate a fifth frequency control signal; a third adjustment unit configured to receive the second frequency control signal and the third frequency control signal to output a control signal reflecting an output voltage frequency of the inverter; and a second integrating unit configured to receive the control signal reflecting the output voltage frequency of the inverter to generate the angle control signal reflecting the output voltage phase of the inverter.

4. The inverter control device of claim 3, wherein the reactive power control unit comprises:
  a reactive deviation generating unit configured to receive the reactive power setting signal, the signal reflecting the reactive power of the inverter, and the signal reflecting the reactive power correcting signal to generate a reactive power deviation signal;
  a voltage adjustment unit configured to receive the reactive power deviation signal to generate a first amplitude control signal reflecting an output voltage amplitude of the inverter; and
  a fourth adjustment unit configured to receive a voltage feedforward signal and output the voltage amplitude control signal based on the voltage feedforward signal and the first amplitude control signal reflecting the output voltage amplitude of the inverter.

5. The inverter control device of claim 2, wherein the first correcting-signal providing unit comprises:
  a first correcting-signal generating unit configured to receive the first frequency control signal and the frequency setting signal to generate a frequency deviation signal; and
  a first proportion unit configured to receive the frequency deviation signal to generate the torque correcting signal reflecting the active power correcting signal.

6. The inverter control device of claim 1, wherein the active power control unit comprises:
  a second superposition unit configured to receive the signal reflecting the active power correcting signal, the active power setting signal, and the signal reflecting the active power of the inverter to generate an acceleration signal; and
  a third integrating unit configured to receive the acceleration signal to generate a third frequency control signal.

7. The inverter control device of claim 6, wherein the active power control unit further comprises any of the following groups:
  group one: a second integrating unit configured to receive the third frequency control signal to generate the angle control signal reflecting the output voltage phase of the inverter;
  group two: a feedforward computation unit configured to receive the acceleration signal to generate a second frequency control signal; a sixth adjustment unit configured to receive the third frequency control signal and the second frequency control signal to generate a control signal reflecting an output voltage frequency of the inverter; and a second integrating unit configured to receive the control signal reflecting the output voltage frequency of the inverter to generate the angle control signal reflecting the output voltage phase of the inverter;
  group three: a seventh adjustment unit configured to receive frequency feedforward signal and output a control signal reflecting an output voltage frequency of the inverter based on the frequency feedforward signal and the third frequency control signal; and a second integrating unit configured to receive the control signal reflecting the output voltage frequency of the inverter to generate the angle control signal reflecting the output voltage phase of the inverter;
  group four: a feedforward computation unit configured to receive the acceleration signal to generate a second frequency control signal; a seventh adjustment unit configured to receive a frequency feedforward signal and the third frequency control signal to generate a fourth frequency control signal; an eighth adjustment unit configured to receive the second frequency control signal and the fourth frequency control signal to output a control signal reflecting an output voltage frequency of the inverter; and a second integrating unit configured to receive the control signal reflecting the output voltage frequency of the inverter to generate the angle control signal reflecting the output voltage phase of the inverter.

8. The inverter control device of claim 7, wherein the reactive power control unit comprises:
  a reactive deviation generating unit configured to receive the reactive power setting signal, the signal reflecting the reactive power of the inverter, and the signal reflecting the reactive power correcting signal to generate a reactive power deviation signal;
  a voltage adjustment unit configured to receive the reactive power deviation signal to generate a first amplitude control signal reflecting an output voltage amplitude of the inverter; and
  a fourth adjustment unit configured to receive a voltage feedforward signal and output the voltage amplitude control signal based on the voltage feedforward signal and the first amplitude control signal reflecting the output voltage amplitude of the inverter.

9. The inverter control device of claim 6, wherein the first correcting-signal providing unit comprises:
  a first correcting-signal generating unit configured to receive the third frequency control signal and the frequency setting signal to generate a frequency deviation signal; and
  a third proportion unit configured to receive the frequency deviation signal to generate the signal reflecting the active power correcting signal.

10. The inverter control device of claim 1, wherein the second correcting-signal providing unit comprises:
  an amplitude computation unit configured to calculate an amplitude signal based on the feedback signal of an output voltage of the inverter;
  a second correcting-signal generating signal configured to receive the amplitude signal and the voltage setting signal and compare the amplitude signal with the voltage setting signal to generate a voltage deviation signal; and
  a second proportion unit configured to receive the voltage deviation signal to generate the signal reflecting the reactive power correcting signal.

11. The inverter control device of claim 1, further comprising a first selection unit and a second selection unit, wherein the first selection unit is configured to select either a frequency signal which reflects a rated output voltage of the inverter or a frequency signal which reflects an actual output voltage of the inverter to be the frequency setting signal, wherein the second selection unit is configured to select either an amplitude signal reflecting the rated output voltage of the inverter or an amplitude signal reflecting the actual output voltage of the inverter to be the voltage setting signal.

12. An inverter control device comprising:
  an active power control unit configured to receive an active power setting signal and a signal reflecting an active power of an inverter to generate an angle control signal reflecting an output voltage phase of the inverter;
  a correcting-signal providing unit configured to receive a voltage setting signal and provide a signal reflecting a reactive power correcting signal;

a reactive power control unit configured to receive the signal reflecting the reactive power correcting signal, a reactive power setting signal, and a signal reflecting a reactive power of the inverter to generate a control signal reflecting an output voltage amplitude of the inverter, wherein the control signal reflecting the output voltage amplitude of the inverter is a voltage amplitude control signal; and a processing unit configured to receive a feedback signal reflecting an output current of the inverter, a feedback signal reflecting an output voltage of the inverter, the angle control signal reflecting the output voltage phase of the inverter, and the control signal reflecting the output voltage amplitude of the inverter to generate the signal reflecting the active power of the inverter, the signal reflecting the reactive power of the inverter, and a voltage command signal.

13. The inverter control device of claim 12, wherein the active power control unit comprises:
a superposition unit configured to receive the active power setting signal and the signal reflecting the active power of the inverter to generate an acceleration signal;
a first proportion unit having a first proportional gain for reflecting an active power droop characteristic of the inverter, the first proportion unit being configured to receive the acceleration signal and output a frequency signal corresponding to the acceleration signal;
a filter unit being serially connected to the first proportion unit and being configured to filter the frequency signal to obtain a first frequency control signal;
a first adjustment unit configured to receive the first frequency control signal and the frequency setting signal to generate a second frequency control signal; and
an integrating unit configured to receive the second frequency control signal to generate the angle control signal reflecting the output voltage phase of the inverter.

14. The inverter control device of claim 12, wherein the reactive power control unit comprises any of the following groups:
group one: a reactive deviation generating unit configured to receive the reactive power setting signal, the signal reflecting the reactive power of the inverter, and the signal reflecting the reactive power correcting signal to generate a reactive power deviation signal; and a voltage adjustment unit configured to receive the reactive power deviation signal to generate the voltage amplitude control signal;
group two: a reactive deviation generating unit configured to receive the reactive power setting signal, the signal reflecting the reactive power of the inverter, and the signal reflecting the reactive power correcting signal to generate a reactive power deviation signal; a voltage adjustment unit configured to receive the reactive power deviation signal to generate a first amplitude control signal reflecting an output voltage amplitude of the inverter; and a second adjustment unit configured to receive a voltage feedforward signal and output the voltage amplitude control signal based on the voltage feedforward signal and the first amplitude control signal reflecting the output voltage amplitude of the inverter.

15. The inverter control device of claim 12, wherein the correcting-signal providing unit comprises:

an amplitude computation unit configured to calculate an amplitude signal based on the feedback signal of the output voltage of the inverter;
a correcting-signal generating unit configured to receive the amplitude signal and the voltage setting signal and compare the amplitude signal with the voltage setting signal to generate a voltage deviation signal; and
a second proportion unit configured to receive the voltage deviation signal to generate the signal reflecting the reactive power correcting signal.

16. An inverter control device comprising:
a first correcting-signal providing unit configured to receive a frequency setting signal and provide a signal reflecting an active power correcting signal;
an active power control unit configured to receive the signal reflecting the active power correcting signal, an active power setting signal, and a virtual torque signal which reflects active power of an inverter to generate a virtual motor rotor angle control signal reflecting an output voltage phase of the inverter;
a second correcting-signal providing unit configured to receive a voltage setting signal and provide a signal reflecting a reactive power correcting signal;
a reactive power control unit configured to receive the signal reflecting the reactive power correcting signal, a reactive power setting signal, and a signal reflecting a reactive power of the inverter to generate a control signal reflecting an output voltage amplitude of the inverter, wherein the control signal reflecting the output voltage amplitude of the inverter is a virtual excitation control signal, and
a processing unit configured to receive a feedback signal reflecting an output current of the inverter, a virtual motor rotor angle control signal reflecting the output voltage phase of the inverter, the control signal reflecting the output voltage amplitude of the inverter to generate the virtual torque signal which reflects the active power of the inverter, the signal reflecting the reactive power of the inverter, and a voltage command signal.

17. The inverter control device of claim 16, wherein the reactive power control unit comprises:
a reactive deviation generating unit configured to receive the reactive power setting signal, the signal reflecting the reactive power of the inverter, and the signal reflecting the reactive power correcting signal to generate reactive power deviation signal;
an excitation adjustment unit configured to receive the reactive power deviation signal to generate a first excitation control signal which reflects the output voltage amplitude of the inverter; and
a fifth adjustment unit configured to receive an excitation feedforward signal and output the virtual excitation control signal based on the excitation feedforward signal and the first excitation control signal.

18. The inverter control device of claim 16, wherein the active power control unit comprises:
a driving torque generating unit configured to receive the active power setting signal and divide the active power setting signal by an angular frequency signal to generate a torque command signal;
a first superposition unit configured to receive the torque command signal, the virtual torque signal which reflects the active power of the inverter, and the signal reflecting the active power correcting signal to generate an acceleration signal, and a first integrating unit configured to receive the acceleration signal to generate a first frequency control signal.

19. The inverter control device of claim 18, wherein the active power control unit further comprises any of the following groups:
 group one: a second integrating unit configured to receive the first frequency control signal to generate the virtual motor rotor angle control signal reflecting the output voltage phase of the inverter;
 group two: a feedforward computation unit configured to receive the acceleration signal to generate a second frequency control signal; first adjustment unit configured to receive the first frequency control signal and the second frequency control signal to generate a control signal reflecting an output voltage frequency of the inverter; and a second integrating nit configured to receive the control signal reflecting an output voltage frequency of the inverter to generate the virtual motor rotor angle control signal reflecting the output voltage phase of the inverter;
 group three: a second adjustment unit configured to receive a frequency feedforward signal and output a control signal reflecting an output voltage frequency of the inverter based on the frequency feedforward signal and the first frequency control signal; and a second integrating unit configured to receive the control signal reflecting the output voltage frequency of the inverter to generate the virtual motor rotor angle control signal reflecting the output voltage phase of the inverter;
 group four: a feedforward computation signal configured to receive the acceleration signal to generate a second frequency control signal; a second adjustment unit configured to receive a frequency feedforward signal and the first frequency control signal to generate a third frequency control signal; a third adjustment unit configured to receive the second frequency control signal and the third frequency control signal to output a control signal reflecting an output voltage frequency of the inverter; and a second integrating unit configured to receive the control signal reflecting the output voltage frequency of the inverter to generate the virtual motor rotor angle control signal reflecting the output voltage phase of the inverter.

20. The inverter control device of claim 19, wherein the reactive power control device comprises:
 a reactive deviation generating unit configured to receive the reactive power setting signal, the signal reflecting the reactive power of the inverter, and the signal reflecting the reactive power correcting signal to generate a reactive power deviation signal;
 an excitation adjustment unit configured to receive the reactive power deviation signal to generate a first excitation control signal which reflects the output voltage amplitude of the inverter; and
 fifth adjustment unit configured to receive an excitation feedforward signal and output the virtual excitation control signal based on the excitation feedforward signal and the first excitation control signal.

21. The inverter control device of claim 18, wherein the first correcting-signal providing unit comprises:
 a first correcting-signal generation unit configured to receive a first frequency control signal and the frequency setting signal to generate a frequency deviation signal; and
 a first proportion unit configured to receive the frequency deviation signal to generate the signal reflecting the active power correcting signal.

* * * * *